US008918226B2

(12) United States Patent
Tojo et al.

(10) Patent No.: US 8,918,226 B2
(45) Date of Patent: Dec. 23, 2014

(54) TEMPERATURE MEASURING METHOD, TEMPERATURE MEASURING APPARATUS, TEMPERATURE CONTROL METHOD, TEMPERATURE CONTROL APPARATUS, CORRECTION METHOD, AND CORRECTION APPARATUS

(75) Inventors: Fumio Tojo, Higashiosaka (JP); Shunzo Hirakawa, Higashiosaka (JP); Toshiyasu Toyoda, Higashiosaka (JP); Masaru Iguchi, Higashiosaka (JP); Katayama Yusuke, Higashiosaka (JP)

(73) Assignee: Yamabun Electronics Co., Ltd., Osaka (JP)

( * ) Notice: Subject to any disclaimer, the term of this patent is extended or adjusted under 35 U.S.C. 154(b) by 1003 days.

(21) Appl. No.: 13/055,973

(22) PCT Filed: Jul. 28, 2009

(86) PCT No.: PCT/JP2009/063441
§ 371 (c)(1),
(2), (4) Date: Jan. 26, 2011

(87) PCT Pub. No.: WO2010/013720
PCT Pub. Date: Feb. 4, 2010

(65) Prior Publication Data
US 2011/0130890 A1 Jun. 2, 2011

(30) Foreign Application Priority Data

Jul. 29, 2008 (JP) ................................ 2008-195251

(51) Int. Cl.
*G05D 23/19* (2006.01)
(Continued)

(52) U.S. Cl.
CPC ............ *G01B 21/085* (2013.01); *G01D 3/0365* (2013.01); *G01K 1/20* (2013.01);
(Continued)

(58) Field of Classification Search
CPC ..................................................... G05D 23/19
USPC ............ 700/300; 374/120, E13.001; 73/1.01
See application file for complete search history.

(56) References Cited

U.S. PATENT DOCUMENTS 3,163,406 A 12/1964 Stelling, Jr. et al.
3,914,477 A * 10/1975 Belue et al. .................. 427/378

FOREIGN PATENT DOCUMENTS

DE 33 12 031 10/1983
JP 55-155905 11/1980
(Continued)

OTHER PUBLICATIONS

International Preliminary Report on Patentability and Written Opinion of the International Searching Authority issued Mar. 17, 2011 in International (PCT) Application No. PCT/JP2009/063441.
(Continued)

*Primary Examiner* — Tejal Gami
(74) *Attorney, Agent, or Firm* — Wenderoth, Lind & Ponack, L.L.P.

(57) ABSTRACT

A temperature measuring method accurately measures a sheet-like object even when the sheet-like object has an uneven temperature distribution throughout. In this method, temperature measurement is conducted in a measuring area where the sheet-like object is to be measured for its physical quantity or in the vicinity of the measuring area during determination of the physical quantity by a physical quantity measuring device. One or more temperature sensors are located at a position proximal to each sheet-like object that streams in a predetermined direction relative to the temperature sensors, and air is jetted out toward the sheet-like object for creating an air curtain that surrounds each temperature sensor so that a gauge workspace substantially confining the atmosphere therein is defined over one or both of the opposite surfaces of the sheet-like object. The temperature sensors detect the temperature in the measuring area or its vicinity within the gauge workspace.

19 Claims, 15 Drawing Sheets

(51) Int. Cl.
*G01D 3/036* (2006.01)
*G01K 1/20* (2006.01)
*G01B 21/08* (2006.01)
*G01K 13/06* (2006.01)
*B29C 55/08* (2006.01)
*B29C 55/06* (2006.01)

(52) U.S. Cl.
CPC ............... *G01K 13/06* (2013.01); *B29C 55/08* (2013.01); *B29C 55/06* (2013.01)
USPC .................. 700/300; 374/120; 374/E13.001; 73/1.01

(56) References Cited

FOREIGN PATENT DOCUMENTS

| | | |
|---|---|---|
| JP | 61-018816 | 1/1986 |
| JP | 09-159438 | 6/1997 |
| JP | 10-170220 | 6/1998 |
| JP | 11-142469 | 5/1999 |
| JP | 2001-128849 | 5/2001 |
| JP | 2002-037490 | 2/2002 |
| JP | 2005-030920 | 2/2005 |
| JP | 2005-121561 | 5/2005 |

OTHER PUBLICATIONS

Supplementary European Search Report issued Oct. 5, 2012 in corresponding European Patent Application No. 09802963.0.
Japanese Office Action issued Jul. 3, 2012 in corresponding Japanese Patent Application No. 2010-282951 with English Translation.
International Search Report issued Oct. 27, 2009 in International (PCT) Application No. PCT/JP2009/063441.

\* cited by examiner $t_f$ : temperature of the measured object $V_t$ : vector sum in the Cartesian coordinate system of traversing velocity of the sheet thickness gauge sensor and streaming velocity of the sheet $V_a$ : velocity of jet air-stream reaching or bumping against the sheet FIG. 10
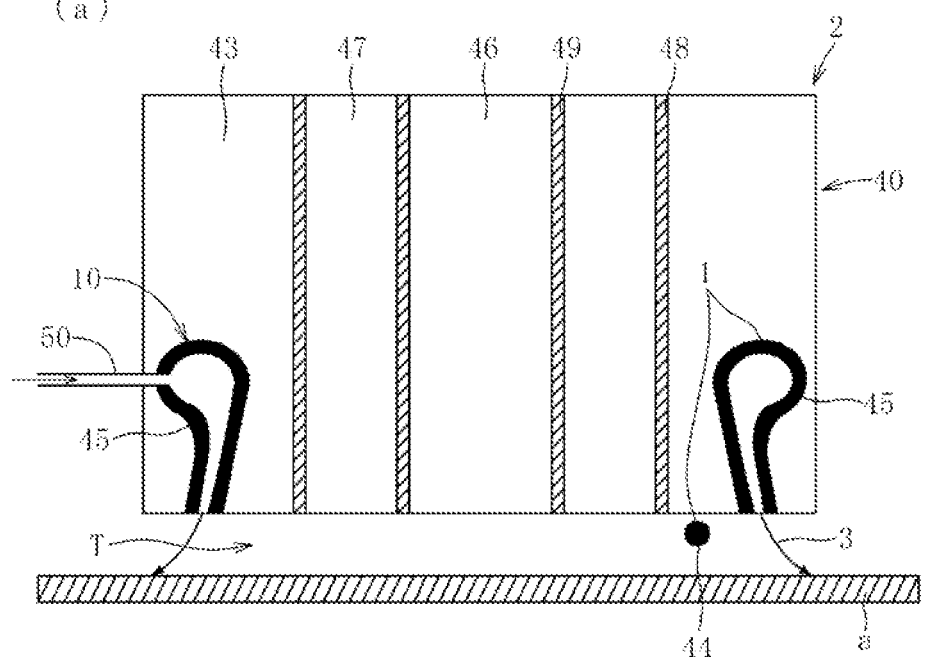
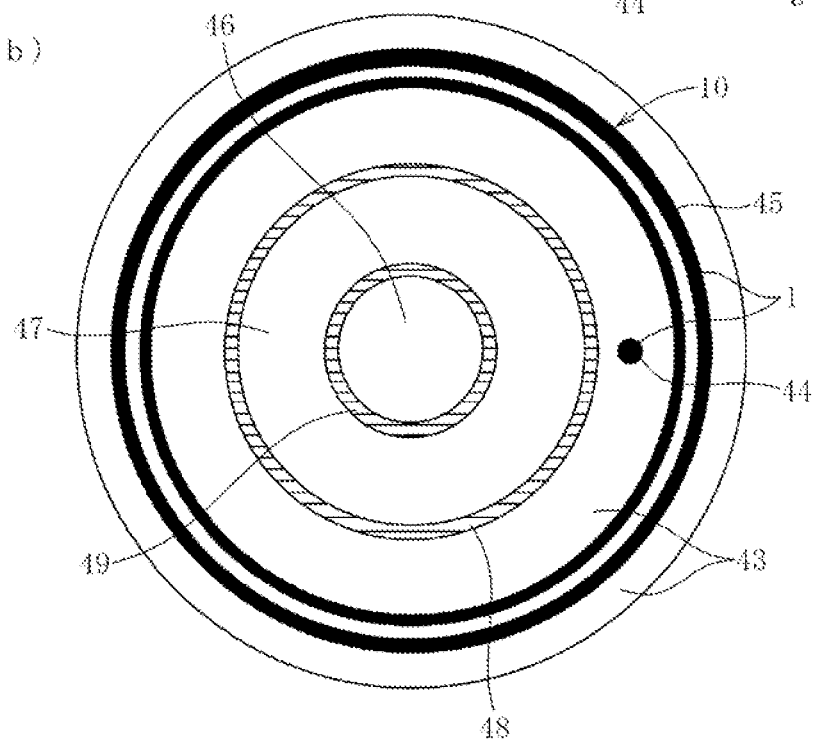

FIG. 11
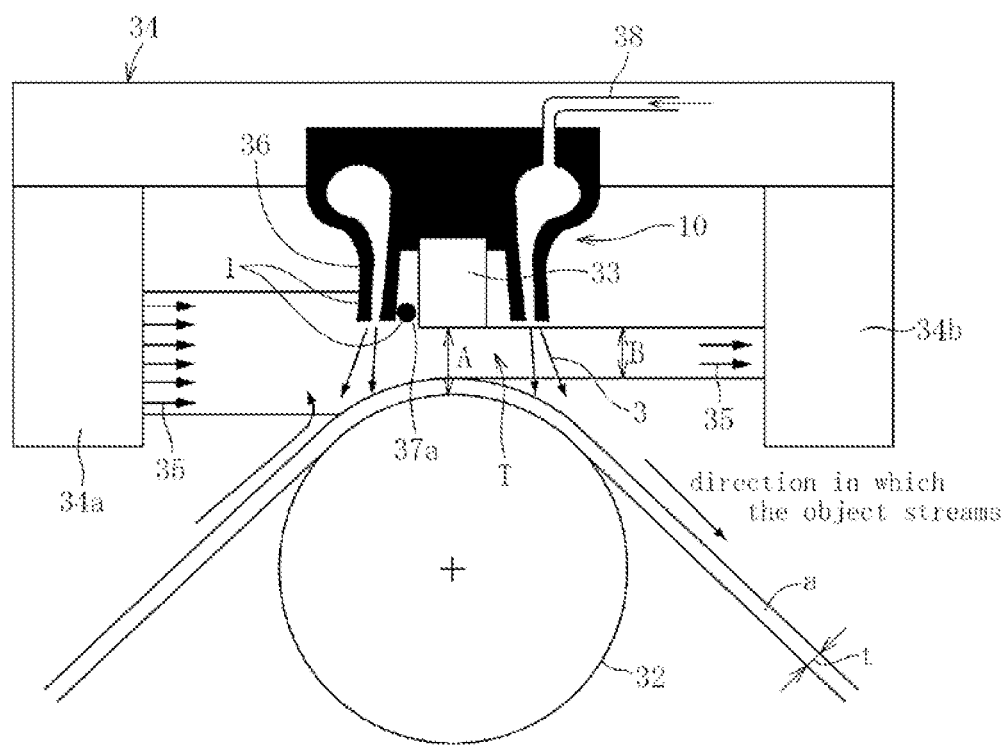
(a)
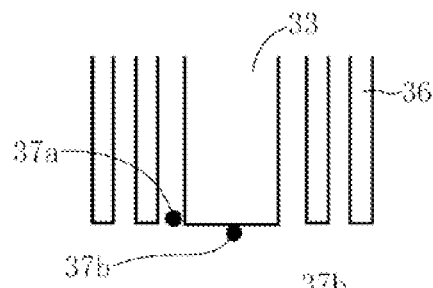
(b)
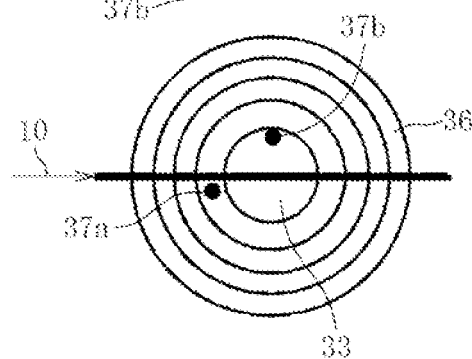
(c)

TEMPERATURE MEASURING METHOD, TEMPERATURE MEASURING APPARATUS, TEMPERATURE CONTROL METHOD, TEMPERATURE CONTROL APPARATUS, CORRECTION METHOD, AND CORRECTION APPARATUS

TECHNICAL FIELD

The present invention relates to temperature measuring methods of determining temperature of sheet-like objects (e.g., webs made of paper, sheet, or film, or sheet-shaped plate pieces) and/or determining that of the ambient air surrounding the sheet-like objects, apparatuses exploiting such measuring methods, temperature control methods of controlling the temperature of the sheet-like objects, apparatuses exploiting such control methods, correcting methods of calibrating physical quantities of the sheet-like objects, and apparatuses exploiting such correcting methods.

BACKGROUND ART

Currently, apparatuses for determining thickness of a dynamic or static stream of films are available (e.g., see Patent Document 1 listed below). The apparatuses disclosed in Patent Document 1 is, as shown in FIG. 16, comprised of a main frame 100, a sheet-thickness gauge sensor 102, a measuring head 103, and a movable mechanism 104. A reference symbol 'a' denotes any of measured objects shaped in sheet.

The main frame 100 is configured to be a frame that permits a sheet(s) a to pass through. The sheet-thickness gauge sensor 102 may be any of those which are capable of emitting electro-magnetic waves, or radioactive or particle rays as well as pneumatic, capacitance-operated, ultrasonic, non-contact or contact gauges, and Patent Document 1 discloses a gauge of pneumatic sensing. In the disclosure, a pair of the sheet-thickness gauge sensors 102 are located respectively over and under the sheet a; i.e., orthognal opposed to each other. Each of the pair of the sheet-thickness gauge sensors 102 is supported at a distal end of the measuring head 103, facing or pointing toward the sheet a by any suitable means such as an air cylinder (not shown) that serves as a reciprocating carriage and allows the head and thus the sensor to come close to and recede from the sheet a. The movable mechanism 104 causes the measuring head 103 to move in lateral directions perpendicular to the passage of the sheet a. Also, a pair of the movable mechanisms 104 are located over and under the passage of the sheet(s) a, opposed to each other within the main frame 100.

Assuming that X-rays are emitted to determine thickness of the sheet a in such a thickness gauge apparatus, the pair of the sheet-thickness gauge sensors 102 are cooperative X-ray emitter and detector in the vertically opposite locations over and under the sheet a, respectively. Specifically, X-rays radiated from the X-ray emitter are directed to the bottom side of the sheet a and then vertically transmitted through the entire thickness of the same, and eventually received at the X-ray detector. The X-rays thus received by the X-ray detector is quantified to determine the thickness of the sheet a.

PRIOR ART DOCUMENT

Patent Document

Patent Document 1:
Preliminary Publication of Unexamined Japanese Patent Application No. H9-159438

SUMMARY OF THE INVENTION

Problem to be Solved by the Invention

As noted above, when some apparatuses capable of emitting electromagnetic waves including X-rays are used to determine thickness of a sheet-like object, a profile of the measured thickness (e.g., approximately 40 micrometers) is thinner than that of the real thickness (e.g., 44 micrometers). This is because the sheet-thickness gauge sensor counts in layers of the air both over and under the sheet in addition to measuring volume of the sheet. More specifically, since the sheet or the object processed and shaped in sheet has generally a temperature greater than the ambient air surrounding the thickness gauge, the air between the sheet and the sheet-thickness gauge sensors is apt to get higher in temperature. Thus, the higher temperature results in the layers of the air reducing in density, and accordingly emissions (e.g., X-rays, $\beta$-rays, $\gamma$-rays, or the like) radiated from the sheet-thickness gauge sensors are reduced in attenuation rates (varied amount). In this way, the resultant profile from the measurement is varied from that of the actual thickness.

With such apparatuses, precise measurement of temperature in a measuring area (an X-ray detectable area by the X-ray detector within thorough reach of the X-rays) and that in the vicinity of the measuring area could bring about an accurate prediction of attenuation rate of emissions radiated from the sheet-thickness gauge sensor, which in turn could be useful to calibrate the measured thickness of the sheet. In particular, first determined is a temperature in a reference point that has lack of sheets, namely, a point of a physical quantity (a thickness of a sheet) of naught if measured, and then, the temperature in the measuring area where the sheet is to be measured for thickness, and concurrently the thickness gauge sensors are used to determine the thickness of the sheet. Depending upon a difference in temperature between the reference point and the measuring area, an attenuation rate of the emissions from the sheet-thickness gauge sensor in the atmosphere of the measuring area is predicted. From the attenuation rate, it also can be presumed how much the measured physical quantity is deviated from the actual physical quantity, and the deviation thus quantified is added to or reduced from the measured physical quantity for compensation so as to obtain the desired value of the actual physical quantity. As previously noted, the precise temperature profile could permit the measured thickness to be accurately corrected, resulting in the desired profile of the measured thickness almost equivalent to the actual thickness of the sheet.

In the prior art apparatuses, a temperature sensor used to detect the temperature in the measuring area of the sheet-thickness gauge sensors is placed apart from the measuring area. In such a situation, air stream due to motions of the sheets and/or turbulent airflow due to the external environment are prone to give adversely effects on the temperature sensor to disturb it from temperature sensing with accuracy. In addition, the temperature sensor cannot accurately determine the temperature in the measuring area also because not located within the measuring area or in the vicinity. Furthermore, since temperature distribution is varied from one sheet to another, or varied from one place to another in any single sheet, compensation for uneven temperature distribution is required for an accurate measurement of the thickness, and measurements conducted on the erroneous assumption that all the sheets or all the places in the single sheet are identical in temperature distribution might lead to inaccuracy of measurement.

When a radiation thermometer is used, emissions radiated from an external heat source and permeated through the sheet are likely to reach and affect the thermometer, resulting in errors of measurement. Additionally, as traversing velocity of the measuring head and/or streaming speed of the sheet are increased, the more quickly responding thermo-couple of more reduced calorific capacity is required, but such a thermo-couple is not applicable because pneumatic turbulence is more liable to have adverse effects on it.

The present invention is made to overcome the aforementioned disadvantages in the prior art, and accordingly, it is an object of the present invention to provide temperature measuring methods and apparatuses that enable accurate measurement of temperature of a sheet-like object in the event that temperature is varied from one sheet-like object to another or that temperature is varied from one place to another in the single sheet-like object. It is another object of the present invention to provide correcting methods and apparatuses that enable compensation for errors in physical quantity that depend upon the temperature distribution throughout the sheet-like object.

Means for Solving Problem

A temperature measuring method according to the present invention is adapted to measure temperature in a measuring area where each of sheet-like objects is to be measured for its physical quantity or the temperature in the vicinity of the measuring area during determination of the physical quantity by a physical quantity measuring means; and the method comprises locating a temperature sensor so that each sheet-like object streams in position proximal to the temperature sensor in a predetermined direction relative to the temperature sensor, jetting air toward one or both of the opposite surfaces of each sheet-like object for creating an air curtain that surrounds the temperature sensor so that a gauge workspace substantially confining the atmosphere therein is defined over one or both of the opposite surfaces of the sheet-like object, the measuring area being within the gauge workspace, and measuring temperature in the measuring area or in the vicinity within the gauge workspace by means of the temperature sensor.

In the temperature measuring method of the present invention, the gauge workspace shielded by the air curtain and substantially confining the atmospheric air therein permits airflow from the external environment to be blocked (so as to prevent air from being fed in), and pneumatic turbulence such as external airflow is shut out of the gauge workspace and the atmospheric air confined therein. Thus, determining temperature within the gauge workspace disturbs the pneumatic turbulence such as the external airflow from exerting any effects on measurements. In addition, although the sheet-like object itself develops airflow as a result of its streaming, the air curtain can shield the airflow resulted from such a streaming object as well. The measuring area, when referred to in the context of a non-contact gauge, designates a segment of the sheet-like object of which physical quantity is to be measured at a certain stage of the procedures and the vicinity of the segment. In other words, it is part of a range within thorough reach of emissions within which the radiated do not only exist but are detectable by the gauge. On the other hand, when referred to in the context of an alternative contact gauge, the measuring area denotes merely a segment of the sheet-like object of which physical quantity is to be measured at a certain stage of the procedures.

A temperature control method according to the present invention is adapted to control temperature in a measuring area where sheet-like objects are to be measured for their respective physical quantity or the temperature in the vicinity of the measuring area during determination of the physical quantity of the sheet-like objects by a physical quantity measuring means while the sheet-like objects are concurrently being processed by heating or cooling; and the method comprises subsequent to the steps of using the physical quantity measuring means to determine the physical quantity of the sheet-like objects processed by heating or cooling and then using the claimed temperature measuring method according to the invention to measure temperature in the gauge workspace, detecting a correlation between the measured physical quantity of each sheet-like object and the measured temperature in the closed workspace, and controlling temperature of each sheet-like object, depending upon the correlation, so that the measured physical quantity has a predetermined ideal value.

In the temperature control method according to the present invention, even if the sheet-like object is being processed by heating or cooling, temperature in the measuring area or the vicinity within the gauge workspace can be measured, which brings about an accurate measurement. This also enables detection of the correlation between the temperature in the gauge workspace, and hence, the temperature of the sheet-like object itself, and the physical quantity of the processed sheet-like object, and controlling temperature of the sheet-like object depending upon the correlations enables the resultant sheet-like object to have the desired physical quantity.

A correction method according to the present invention is adapted to calibrate a physical quantity of sheet-like objects; and the method comprises measuring temperature in a reference point that has lack of the sheet-like objects, subsequent to the step of measuring temperature in the reference point, determining the physical quantity of each sheet-like object by a physical quantity measuring means, measuring temperature of the sheet-like object in a measuring area in concordance with the claimed temperature measuring method according to the present invention, the measuring area being a segment where the physical quantity of the sheet-like object has been determined within a gauge workspace, subsequent to the step of measuring temperature in the measuring area, calculating a difference between the temperatures in the reference point and in the measuring area, computing a variation in detection by the physical quantity measuring means, depending upon the difference in temperature, scaling a deviation of the physical quantity of the sheet-like object measured by the physical quantity measuring means according to the variation in detection, and adding or reducing the deviation of the physical quantity to or from the measured physical quantity of the sheet-like object to correct the physical quantity of the sheet-like object.

In the correcting method according to the present invention, temperature can be measured in the measuring area within the gauge workspace, which brings about an accurate measurement of the difference between the temperature in the reference point and the measured temperature of the sheet-like objects. This enables compensation for deviation of the physical quantity due to the difference in temperature. In other words, depending upon the difference in temperature, a variation in emissions radiated from the physical quantity measuring means can be obtained with accuracy in the atmosphere confined in the gauge workspace, and, in turn, depending on the variation in emissions thus obtained, a deviation of the measured physical quantity from the actual one can be obtained; that is, the deviation may be added to or reduced from the measured physical quantity to have the actual physical quantity. The term 'gauge workspace' denotes the entire region where the physical quantity of the sheet-like objects is to be determined, and it occupies a greater area than the measuring area. The term 'variation in emissions' designates a rate of attenuation of emissions or the radiated.

A temperature measuring apparatus according to the present invention is incorporated in a physical quantity measuring means for determining a physical quantity of sheet-like objects and is adapted to measure temperature in a measuring area where the physical quantity of the sheet-like objects are to be measured or in the vicinity of the measuring area, each sheet-like object passing the measuring area in a relative manner to the temperature measuring apparatus; and the temperature measuring apparatus comprises one or more temperature sensors located in position proximal to each sheet-like object, and an external airflow shielding means jetting air toward the sheet-like object for creating an air curtain that surrounds the temperature sensor and the measuring area so that a gauge workspace substantially confining the atmosphere therein is defined over one or both of the opposite surfaces of each sheet-like object, the measuring area being within the gauge workspace, and the temperature sensor being used to detect temperature in the measuring area or in the vicinity of the measuring area within the gauge workspace.

The temperature measuring means may comprise a first external airflow shielding means for defining the gauge workspace over one of the opposite surfaces of each sheet-like object and a second external airflow shielding means for defining the gauge workspace over the other surface of the sheet-like object.

The physical quantity measuring means emits electromagnetic waves, or radioactive or particle rays toward the sheet-like object to detect the electromagnetic waves, or radioactive or particle rays transmitted through the sheet-like object, and temperature measurement can be conducted within or out of reach of the electromagnetic waves, or radioactive or particle rays emitted by the physical quantity measuring means. The physical quantity measuring means may be any selected from capacitance-operated, pneumatic, ultrasonic, and contact gauges.

The electromagnetic waves, or radioactive or particle rays emitted from the physical quantity measuring means may be any selected from α-rays, β-rays, γ-rays, X-rays neutron-rays, visible-light beams, ultraviolet light beams, infrared rays, and laser beams.

The sheet-like object is a single indiscrete object or each of a series of pieces that streams in a direction along its longitudinal extension, and streaming velocity of the sheet-like object is not greater than velocity of jet air-stream reaching or bumping against the sheet-like object over which the air curtain of the airflow drape.

The temperature measuring means may be provided with one or more nozzles that are capable of jetting temperature and/or humidity adjusting gaseous fluid to create a steady environment within the gauge workspace on which the external air has no effects of its temperature and/or humidity.

The physical quantity may be any selected from thickness-wise and lengthwise dimensions, mass, density, basis weight, electric current, electric charge, voltage, potential difference, force, energy, velocity, magnetism, and optical properties of the sheet-like object.

A temperature control apparatus according to the present invention is adapted to control temperature of sheet-like objects while each sheet-like object is being processed by heating or cooling; and the temperature control apparatus comprises a physical quantity measuring means for determining a physical quantity of the sheet-like object subsequent to the process by heating or cooling, the claimed temperature measuring apparatus according to the present invention for measuring temperature in the gauge workspace, and hence, the sheet-like object itself in the gauge workspace, an arithmetic operating means for detecting a correlation between the physical quantity of the sheet-like object subsequent to the process by heating or cooling and the measured temperature of the sheet-like object in the gauge workspace, and a regulating means for controlling the temperature of the sheet-like object so that the physical quantity has a predetermined ideal value.

A correcting apparatus according to the present invention is adapted to calibrate a physical quantity for which sheet-like objects have been measured by a physical quantity measuring means; and the correcting apparatus comprises the claimed temperature measuring apparatus according to the present invention for measuring temperature in a reference point that has lack of the sheet-like objects and the temperature in the measuring area where each sheet-like object is to be measured for its physical quantity within the gauge workspace, and an arithmetic operating means computing a difference between the temperature measured in the reference point and that measured in the measuring area, computing a variation rate in emissions radiated from the physical quantity measuring means, depending upon the difference in temperature, scaling a deviation of the measured physical quantity of the sheet-like object from the real physical quantity of the same according to the variation rate, adding or reducing the deviation to or from the measured physical quantity of the sheet-like object to correct the physical quantity of the sheet-like object for eventually determining the physical quantity of the sheet-like object.

The physical quantity measuring means determines the physical quantity of the sheet-like object while it is traversing both in lateral directions along the widthwise extension of the sheet-like object and longitudinal directions perpendicular to the same.

The sheet-like object streams in a longitudinal direction along its lengthwise extension, and the vector sum in the Cartesian coordinate system of traversing velocity of the physical quantity measuring means and streaming velocity of the sheet-like object is not greater than velocity of jet air-stream reaching or bumping against the sheet-like object over which the air curtain of the airflow drape.

Effect of the Invention

With the temperature measuring method and the temperature measuring apparatus according to the present invention, since temperature measurement is conducted in the shielded gauge workspace, pneumatic turbulence such as external airflow as well as air stream caused by the sheet-like object itself has no adverse effects on the measurement, the atmosphere confined in the gauge workspace can be measured sensitively and accurately for its temperature that should be almost identical to the temperature of the sheet-like object. In this way, even when temperature is varied from one sheet-like object to another, or even when temperature is varied from one place to another in the single sheet-like object, namely, when it has an uneven temperature distribution, sensitive and accurate temperature measurement can be attained.

Further providing first and second external airflow shielding means for respectively defining the gauge workspace over the upper and lower surfaces of the sheet-like object, the sheet-like object is prevented from fluttering, and hence, a precision of measurement can be enhanced as much.

In order to measure the physical quantity of the sheet-like object, the physical quantity measuring means is used which emits electromagnetic waves, or radioactive or particle rays toward the sheet-like object while concurrently temperature is measured within reach of the radiated electromagnetic waves, or radioactive or particle rays, and therefore, the temperature in the measuring are can be measured with accuracy. In addition, measuring temperature out of reach of the electromagnetic waves, or radioactive or particle rays emitted from the physical quantity measuring means prevents the temperature sensor from blocking the electromagnetic waves, or radioactive or particle rays, and therefore, the physical quantity can be determined with enhanced accuracy.

The electromagnetic waves emitted from the physical quantity measuring means may be any of γ-rays, X-rays, visible-light beams, ultraviolet light beams, infrared rays, and laser beams as well as radioactive rays like α-rays or β-rays. Alternatively, particle rays such as neutron beams may be emitted. The physical quantity may be determined by any means selected from capacitance-operated, pneumatic, ultrasonic, and contact gauges, and in this way, this embodiment of the present invention is employed in a wide range of applications and exhibits excellent versatility.

With the streaming velocity of the sheet-like object being not greater than the velocity of jet air-stream reaching or bumping against the sheet-like object over which the air curtain of the air flow drape, external air is prevented from intruding into the gauge workspace shielded by the air curtain, thereby keeping the gauge workspace stable.

With gaseous fluid jetted for regulating temperature and/or humidity inside the gauge workspace, external temperature and humidity have no adverse effects on the environment within the gauge workspace, and measurement can be conducted therein with enhanced precision.

The physical quantity may be a thickness-wise dimension of the sheet-like object. In this way, this embodiment can be applied to thickness gauges that are actuated with air or gases existing between the sheet-like object and the physical quantity measuring means, some other gauges for measuring temperature distribution during sheet/film fabricating processes, etc. Further alternatively, this embodiment may be applied to various instruments other than the thickness gauges; that is, a variety of gauges for measuring lengthwise dimension, mass, density, basis weight, electric current, electric charge, voltage, potential difference, force, energy, velocity, magnetism, and optical properties, and in this way, this embodiment of the present invention exhibits excellent versatility.

Since the temperature control method and the temperature control apparatus according to the present invention can be used to conduct accurate measurement even for the sheet-like object that is to be measured for temperature while they are being processed by heating or cooling, a correlation of the temperature of the sheet-like object with its physical quantity can be obtained, and eventually depending on the correlation, the physical quantity can be controlled with enhanced precision. Thus, even when temperature is varied from one sheet-like object to another, or even when temperature is varied from one place to another in the single sheet-like object, namely, when it has an uneven temperature distribution, sensitive and accurate temperature measurement can be conducted, which in turn enables the physical quantity of the sheet-like object to be determined with enhanced accuracy.

With the correcting method and the correcting apparatus according to the present invention, since temperature measurement can be accurately conducted in the measuring area where the sheet-like object is to be measured for the physical quantity, it is possible to compensate for a deviation of the physical quantity caused by varied temperature between the positions inside and outside the measuring area. Thus, even when temperature is varied from one sheet-like object to another, or even when temperature is varied from one place to another in the single sheet-like object, namely, when it has an uneven temperature distribution, sensitive and accurate temperature measurement can be conducted, thereby obtaining the physical quantity of the sheet-like object with enhanced precision.

The physical quantity measuring means may be adapted to measure the physical quantity of the sheet-like object while it is traversing in lateral directions along the widthwise extension of the sheet-like object and directions perpendicular to them, thereby optimizing the measurement of the sheet-like object for its thickness.

In this case, provided that the vector sum in the Cartesian coordinate system of traversing velocity of the physical quantity measuring means and streaming velocity of the sheet-like object is not greater than velocity of jet air-stream reaching or bumping against the sheet-like object over which the air curtain of the airflow drape, external air is prevented from intruding into the gauge workspace in the event that the sheet-like object streams in the longitudinal direction while the physical quantity measuring means traverses in the lateral directions. This enables the gauge workspace to be kept stable.

BRIEF DESCRIPTION OF THE DRAWINGS

FIG. 10 depicts a variation of the temperature measuring apparatus in the second preferred embodiment according to the present invention where (a) is a partial enlarged cross-sectional view while (b) is a bottom view;

FIG. 11 depicts a third preferred embodiment of the temperature measuring apparatus according to the present invention where (a) is a cross-sectional view, (b) is a partial enlarged cross-sectional view, and (c) is a bottom view;

Figure 1:
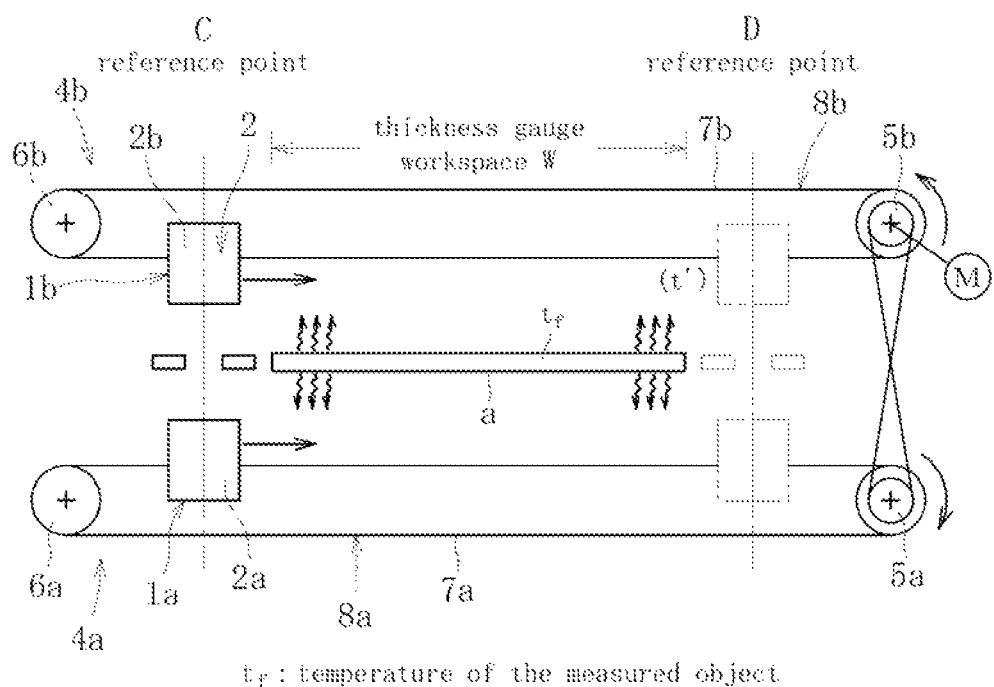
FIG. 1 is a schematic frontal view showing a physical amount measuring apparatus serving as a physical quantity gauge in a first preferred embodiment according to the present invention.

REFERENCE SIGNS LIST 2 physical quantity gauge members
3 air curtain
10 external airflow shielding members
20 arithmetic operation means
21 temperature difference computing means
22 attenuation rate computing means
23 scaling means
24 correcting means
a sheet
T airflow curtain Mode for Carrying Out the Invention Preferred embodiments of the present invention will now be described in conjunction with the accompanying drawings, FIGS. 1 to 15.

A first embodiment of a temperature measuring apparatus according to the present invention is adapted to measure temperature of a dynamic or static stream of a sheet-like object(s) such as webs made of paper, sheet, or film, or sheet-shaped plate pieces. A correcting apparatus according to the present invention is directed to calibrate a physical quantity for which the sheet-like object has been measured. FIG. 1 depicts a physical quantity measuring apparatus comprised of thermometer members 1a, 1b, physical quantity gauge members 2a, 2b for determining a physical quantity of a sheet-like object, and carriage mechanism members 4a, 4b. In this embodiment, the sheet-like object is exemplified as a sheet a that is streaming in a longitudinal direction along its lengthwise extension at a predetermined velocity, and the physical quantity of the sheet a is its thickness. Temperature is measured both in a reference point C that has lack of the sheet a (outside a thickness gauge workspace W) and in the thickness gauge workspace W where the sheet a is to be measured for its thickness, and the thickness measured in the thickness gauge workspace W is corrected depending upon a difference between the temperatures thus obtained. The thickness gauge workspace W designates the entire range where the sheet a is possibly to be measured for its thickness.

Figure 2:
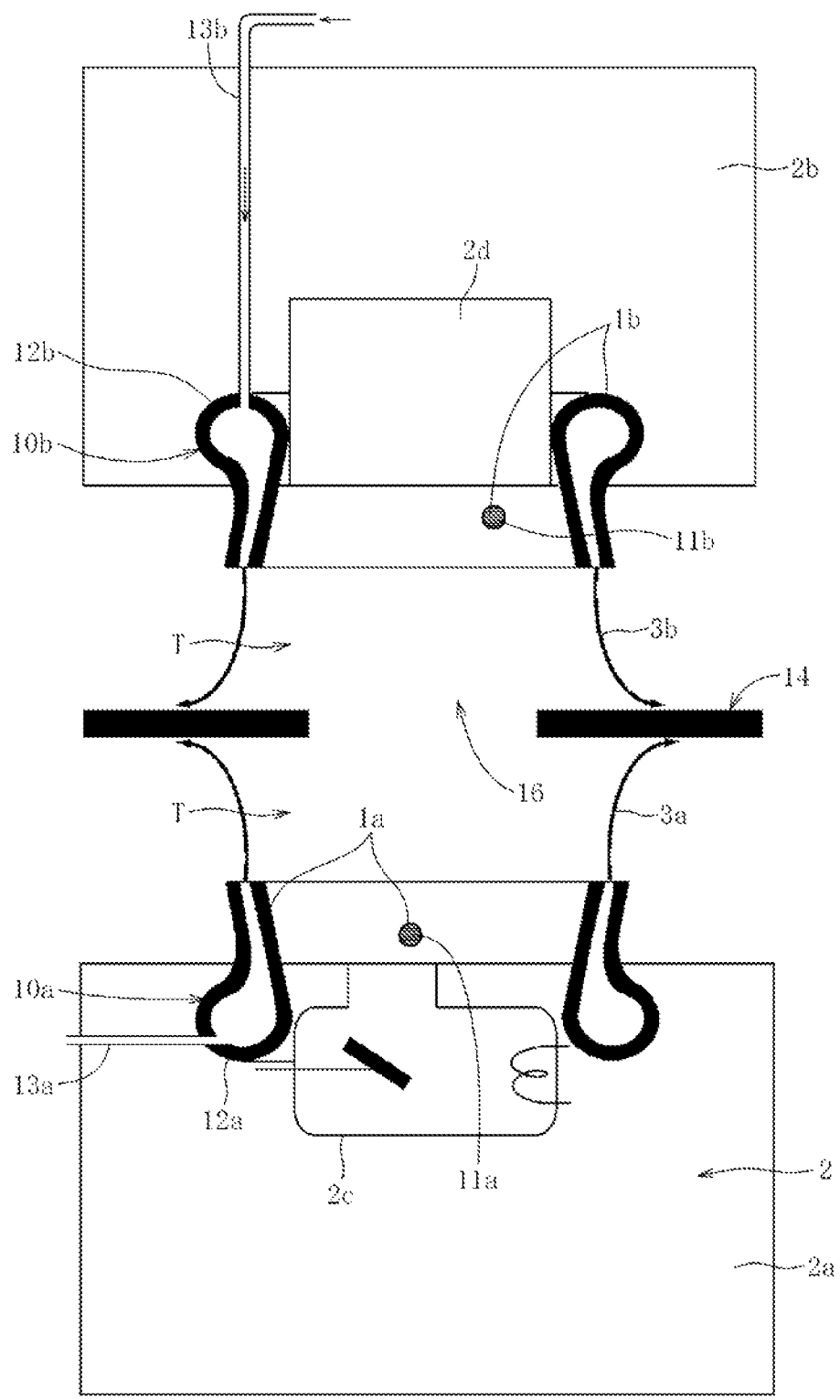
FIG. 2 is a partial enlarged cross-sectional view showing a reference point in the physical quantity measuring apparatus.

The physical quantity measuring apparatus is provided with the thickness gauge workspace W where the sheet a is to be measured and the reference point C without the sheet a when the point is put on active duty. In the reference point C, as shown in FIG. 2, an annular rectifying plate 14 is located, having an opening 16 centered therein. This permits temperature measurement to be conducted under almost the same condition in both the reference point C and the thickness gauge workspace W.

The physical quantity measuring means 2 (see FIG. 1) may be any of sheet-thickness gauge sensors capable of detecting thickness of the sheet a. The sheet-thickness gauge sensors are roughly classified into non-contact and contact types. The non-contact type sensors include those which are capable of emitting electromagnetic waves, or radioactive or particle rays selected from α-rays, β-rays, γ-rays, X-rays, neutron-rays, visible-light beams, UV-light beams, infrared rays, and laser beams as well as pneumatic, capacitance-operated, ultrasonic sensors, and the like. The contact type sensors include those which have displacement sensors located over and under the sheet a and make distal ends of the sensors come in contact with the sheet a as if they were pinching the sheet. One typical sheet-thickness gauge sensor is described as an X-ray emission type sensor in this embodiment. The sheet-thickness gauge sensor 2 has X-ray emitter 2a and X-ray detector 2b over and under the sheet a, opposed to each other. X-rays radiated from an X-ray generator 2c in the X-ray emitter 2a are directed from a position under the sheet a in a direction across its thickness, and the X-rays thus emitted are received by an X-ray receptor 2d in the X-ray detector 2b (see FIG. 2). Quantifying the X-rays received by the X-ray receptor 2d enables determination of the thickness of the sheet a.

The carriage mechanism members 4a, 4b respectively have carriage means 8a, 8b which are respectively comprised of driver pulley elements 5a, 5b, follower pulley elements 6a, 6b, and belt members 7a, 7b respectively extended between the driver and follower pulleys, and the driver pulley elements 5a 5b rotated by any suitable driving means such as a motor M permit the physical quantity gauge members 2a, 2b to reciprocate along the lengthwise extension of the sheet a. The physical quantity gauge members 2a, 2b further include their respective additional carriage means (not shown), so that they can make a single unbroken movement from one end to the other of the sheet a or make intermittently repetitive equidistant movements along the widthwise extension of the sheet a while traversing in both longitudinal and widthwise directions to the sheet a.

Figure 3:
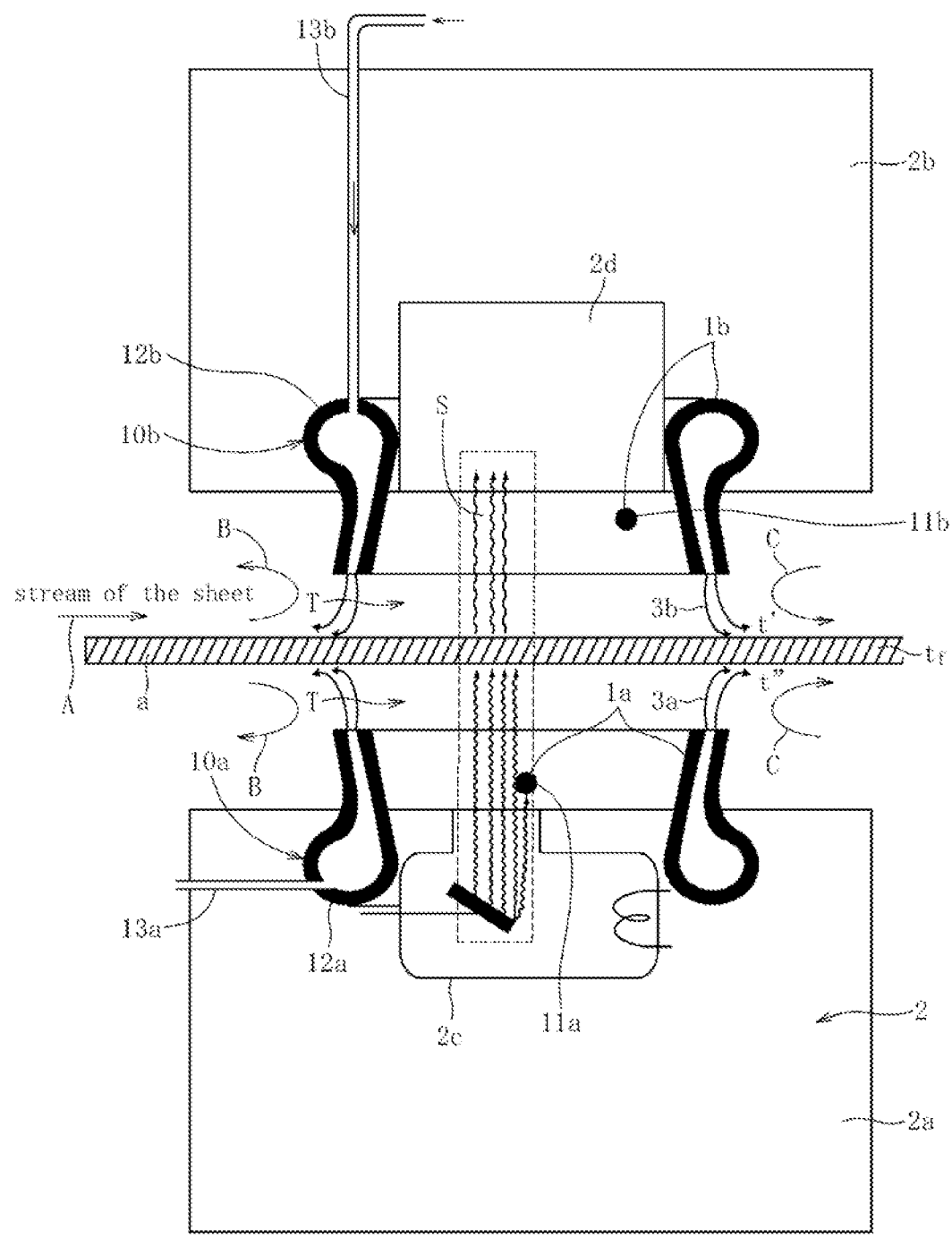
FIG. 3 is a partial enlarged cross-sectional view showing a first preferred embodiment of a temperature measuring apparatus according to the present invention.

The thermometer members 1a, 1b are respectively comprised of external airflow shielding members 10a, 10b and temperature sensing members 11a, 11b, as shown in FIG. 3. The first external airflow shielding member 10a is located in the X-ray emitter 2a of the sheet-thickness gauge sensor 2 while the second external airflow shielding member 10b is located in the X-ray detector 2b of the sheet-thickness gauge sensor 2. In this case, the first and second external airflow shielding members 10a, 10b have their respective air supplies (not shown), nozzles 12a, 12b feeding air toward the sheet a, and air conduits 13a, 13b leading air from the air supplies to the nozzles 12a, 12b, respectively. The nozzles 12a, 12b are respectively configured in dual cylinders defined by inner and outer walls. This is because an air-blowing orifice is annular in shape. While air is being jetted out of the nozzles 12a, 12b toward the sheet a, air stream serves as an airflow curtain (air curtain) 3a draping over the upper side of the sheet a and another air curtain 3b over the lower side of the sheet a, resulting in an encircling air curtain T around the thickness measuring region of the sheet a. A pair of the encircling air curtains T draping over both the upper and lower sides of the sheet a, which not only prevent the sheet a from fluttering but also shield turbulent flows (arrows B and C) caused by the sheet a streaming as indicated by an arrow A in FIG. 3 and/or by the external environment, confine the atmosphere in a gauge workspace (the shielded atmosphere free from external airflow). In this way, as will be recognized in FIG. 3, assuming now that t' and t" respectively designate temperatures in the atmosphere above and below the upper and lower surfaces of the sheet a outside the encircling air curtains T, the atmosphere inside the shield of the air curtains T is not affected by pneumatic turbulence such as external airflow, and therefore, its temperature is affected simply by temperature $t_f$ of the sheet a. Thus, the gauge workspace or the atmosphere shielded by the encircling air curtains T is approximately equivalent or close in temperature to $t_f$.

Figure 4:
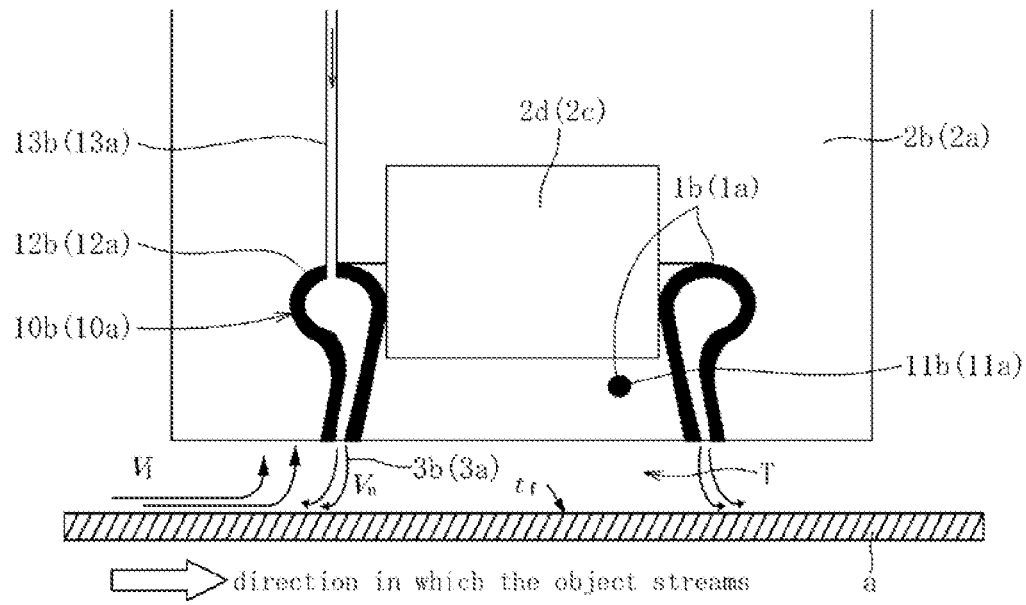
FIG. 4 is a partial enlarged cross-sectional view showing the temperature measuring apparatus in the first preferred embodiment according to the present invention.
Figure 5:
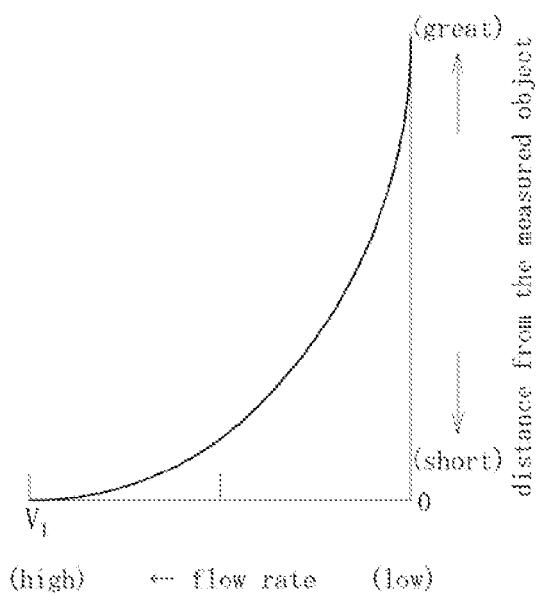
FIG. 5 is a graph illustrating a relation between flow rate of airflow caused by a streaming sheet-like object and a distance from the sheet-like object.

In this case, as can be seen in FIG. 4, the vector sum V1 in the Cartesian coordinate system of traversing velocity of the sheet-thickness gauge sensor 2 and streaming velocity of the sheet a is not greater than velocity of jet air-stream reaching or bumping against the sheet a, namely, Vn. In the event that the traversing velocity of the sheet-thickness gauge sensor 2 added to the streaming velocity of the sheet a in the Cartesian coordinate system is expressed as the vector sum V1, the turbulent flows associated with the streaming motion of the sheet a have flow rate coming closer to zero as it is farther away from the sheet a, as illustrated in a graph of FIG. 5 while the turbulent flows have the flow rate closer to V1, possibly increased as high as the maximum velocity V1 as it is a shorter distance from the sheet a (on or closely around the surface of the sheet a). Thus, retaining the condition as mathematically expressed as Vn>V1, external air is prevented from intruding into the encircling air curtains T, and perfect shielding of the air curtains T is ensured.

Inside the encircling air curtains T, as shown in FIG. 3, disposed are the temperature sensing members 11a, 11b that detect temperature of the atmosphere shielded from external airflow by the encircling air curtains and thus the temperature of the sheet a. In this case, the temperature sensing members 11a, 11b are preferably quickly responding temperature sensors of more reduced calorific capacity (e.g., thermo-couples other than radiation thermometers, resistance bulb thermometers, or the like). One of the temperature sensing members, namely, 11a is located within reach of X-rays emitted from the sheet-thickness gauge sensor 2. The other temperature sensing member 11b is out of reach of the X-rays emitted from the sheet-thickness gauge sensor 2.

Figure 6:
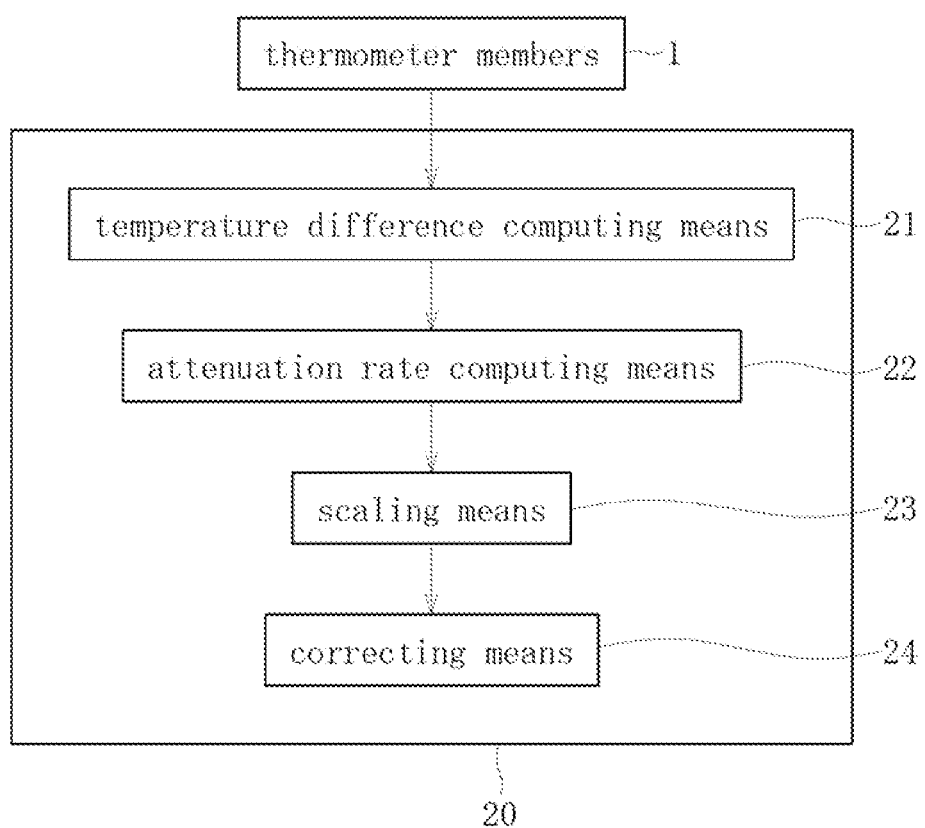
FIG. 6 is a block diagram showing a correcting apparatus according to the present invention.

Also, as can be seen in FIG. 6, there is provided an arithmetic operation means 20 that is capable of correcting the thickness of the sheet a determined within the thickness gauge workspace W (FIG. 1), depending upon the temperature determined in the reference point C (FIG. 1) by the temperature measuring apparatus 1 and the temperature determined in the thickness gauge workspace. The arithmetic operation means 20 is comprised of a temperature difference computing means 21 for producing a temperature difference between the temperature in the reference point C and that in the atmosphere confined in the gauge workspace W and free from external airflow, a attenuation rate computing means 22 receiving the temperature difference for producing a varied amount (an attenuation rate in this embodiment) of the X-rays emitted from the thickness gauge sensor 2, a scaling means 23 for scaling a deviation of the measured thickness of the sheet a from the actual thickness of the same to the attenuation rate, a correcting means 24 adding or reducing the deviation to or from the measured thickness of the sheet a to compensate for the deviation and determine the eventual thickness. The arithmetic operation means 20 may be a microcomputer (not shown).

Figure 7:
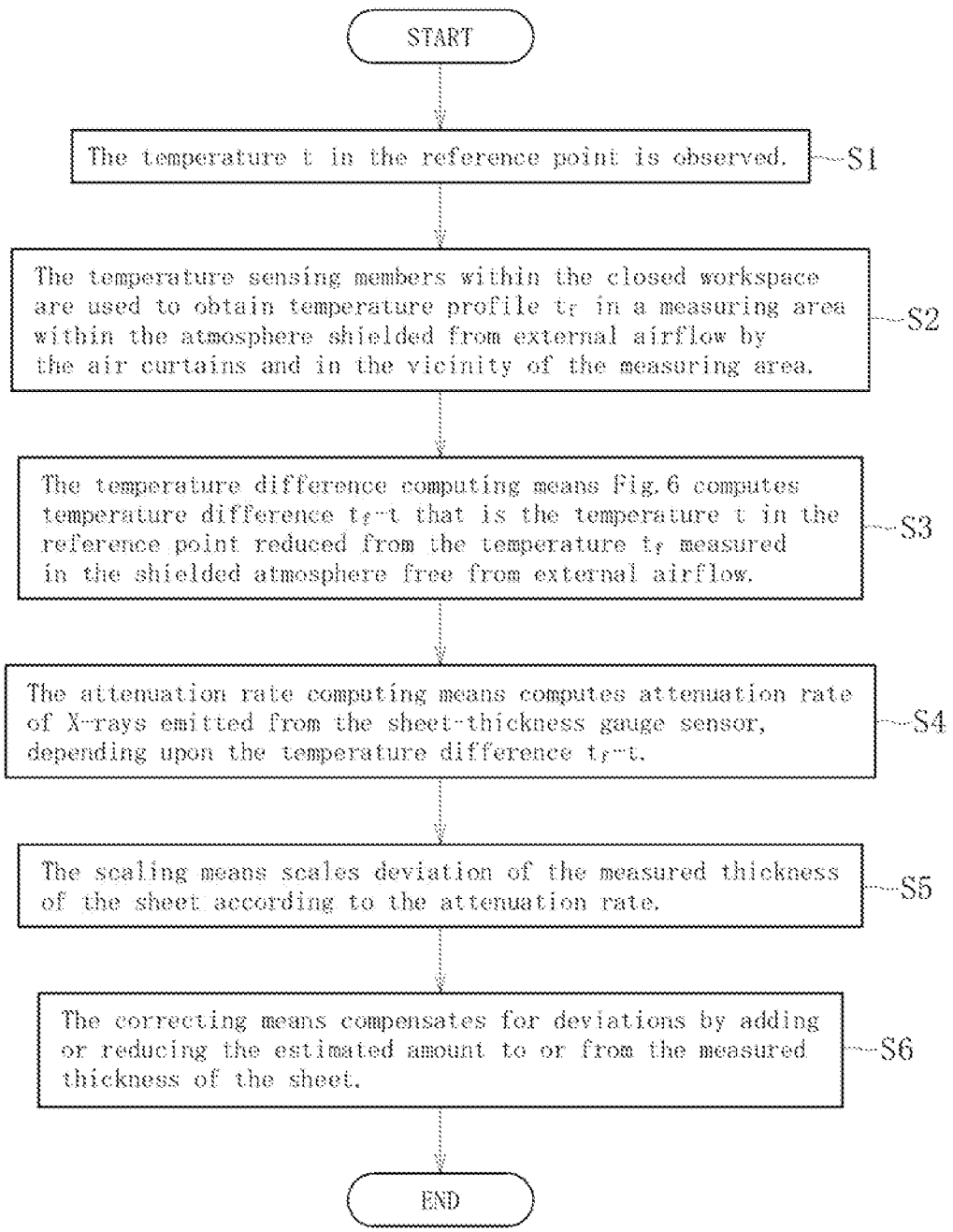
FIG. 7 is a flow chart illustrating a correcting method according to the present invention.

A correcting method in which the aforementioned correcting apparatus is used to correct the thickness of the sheet a will now be described with reference to a flow chart in FIG. 7. The temperature measuring apparatus 1 in FIG. 1 (therefore, the sheet-thickness gauge sensor 2) is moved to the reference point C that has lack of the sheet a, and the temperature t in the reference point C is observed (Step S1).

Next, the motor M in FIG. 1 actuates the carriage mechanism 4 to cause the thickness gauge sensor 2 to make a single unbroken movement or intermittently repetitive equidistant movements along both the lengthwise and widthwise extensions of the sheet a within the thickness gauge workspace. During the movement(s) in such a manner, the X-ray generator 2c in the X-ray emitter 2a emits X-rays toward the X-ray receptor 2d in the X-ray detector 2b, and the sheet a is measured for its thickness in varied points. Air jetted out of the nozzles surrounding the sheet-thickness gauge sensor 2 is directed toward the sheet a so as to develop air curtains draping over the sheet a around the thickness gauge and create a closed workspace inside the encircling air curtains T, and the temperature sensing members 11a, 11b within the closed workspace are used to obtain temperature profile $t_f$ in a measuring area S within the atmosphere shielded from external airflow by the air curtains and in the vicinity of the measuring area S (Step S2). The measuring area S designates part of a range defined by reach of emissions within which the radiated do not only exist but are detectable with the receptor 2d, as defined by broken line in FIG. 3.

The temperature difference computing means 21 in FIG. 6 computes temperature difference $t_f$–t that is the temperature t in the reference point C reduced from the temperature $t_f$ measured in the atmosphere free from external airflow within the closed thickness gauge workspace W (Step S3), and the attenuation rate computing means 22 computes attenuation rate of X-rays emitted from the sheet-thickness gauge sensor 2, depending upon the temperature difference $t_f$–t (Step S4). Subsequently, the scaling means 23 scales deviation of the measured thickness of the sheet a according to the attenuation rate (Step S5), and the correcting means 24 compensates for deviations by adding or reducing the estimated amount to or from the measured thickness of the sheet a (Step S6) to obtain an accurate measurement of the thickness of the sheet a.

Thus, in the correcting apparatus in the first preferred embodiment according to the present invention, the external airflow shielding means 10 (FIGS. 2, 3 and 4) blocks airflow caused by the streaming sheet a and/or by the external environment, and by virtue of the closed space isolated from external airflow by the shielding mean, pneumatic turbulence such as external airflow has almost no effects on the atmosphere confined in the closed space. In this manner, temperature observed in the atmosphere free from external airflow can be an accurate measurement as a result of no adverse effect of the pneumatic turbulence such as external airflow in a condition of ensuring sensitivity within the closed thickness gauge workspace W that confines the atmosphere having almost the same temperature as the sheet a. Eventually, even if the sheet a has its temperature varied from one place to another, namely, if temperature distribution is uneven throughout the sheet a, still sensitive and accurate temperature measurement can be conducted.

As a result of accurately measuring temperature in the closed thickness gauge workspace W where the sheet a is to be measured for its thickness, an accurate difference from the temperature of the sheet a detected in the reference point C can be obtained. From this temperature difference, the attenuation rate of the X-rays emitted from the sheet-thickness gauge sensor 2 is determined, and deviation of the measured thickness is scaled to the attenuation rate, resulting in the real thickness of the sheet being able to be estimated by adding or reducing the amount of deviation to or from the measured thickness.

The external airflow shielding means 10, which is adapted to blow air directed to the sheet a so as to serve as the air curtains 3a, 3b, can fulfill the requirements for the reliable external airflow shielder.

Further providing the first and second external airflow shielding members 10a, 10b respectively shielding the atmosphere from external airflow by blown air over both the upper and lower surfaces of the sheet a, the sheet a can be prevented from fluttering during the measurement process, a precision of measurement can be enhanced as much.

With the sheet thickness gauge sensor 2 that is used for measuring thickness of the sheet a while emitting X-rays therefrom, temperature measurement within reach of the X-rays brings about an enhanced accuracy of the temperature in the measuring area, which, in turn, leads to an accurate measurement of the attenuation rate of the X-rays. In addition, observing temperature out of reach of the X-rays emitted from the sheet-thickness gauge sensor 2, it is avoidable that the temperature sensing member 11b probably blocks the X-rays, thereby enabling an accurate measurement of the physical quantity.

Electro-magnetic waves emitted from the sheet-thickness gauge sensor 2 include visible light beams, ultra-violet light beams, γ-rays, infrared rays, and laser beams as well as X-rays. Moreover, radiations such as α-rays, β-rays and the like may be alternatively used. Furthermore, particle beams such as neutron rays may be another alternative. In this way, this embodiment of the present invention is employed in a wide range of applications and exhibits excellent versatility.

The sheet a typically streams in the longitudinal direction, and the vector sum V1 of traversing velocity of the sheet-thickness gauge sensor 2 and streaming velocity of the sheet a is not greater than velocity of jet air-stream reaching or bumping against the sheet a, namely, Vn. This prevents external air from intruding inside the encircling air curtains T, and hence, keeps the atmosphere confined by the air curtains stable and free from external airflow.

In the embodiment described so far, the thickness of the sheet a is referred to as the physical quantity, and it founds some applications that utilize thickness gauges actuated with air or gases existing between sheet-like objects and the physical quantity measuring means, some other gauges for measuring temperature distribution during sheet/film fabricating processes, and so forth. Further alternatively, this embodiment may be applied to various instruments other than the thickness gauges; that is, a variety of gauges for measuring lengthwise dimension, mass, density, basis weight, electric current, electric charge, voltage, potential difference, force, energy, velocity, magnetism, and optical properties, and in this way, this embodiment of the present invention is employed in a wide range of applications and exhibits excellent versatility.

Also, in the aforementioned embodiment, the sheet-thickness gauge 2 traverses in lateral directions along the widthwise extension of the sheet a and in directions perpendicular to the lateral directions, and it may not traverse in any direction (i.e., fixed in position). In the latter case, it is desirable that the sheet a streams in a longitudinal direction at a velocity that is not greater than the airflow of the air curtains reaching or bumping against the sheet a. This prevents the external airflow from intruding inside the atmosphere shielded by the air curtains, thereby keeping the atmosphere confined by the air curtains stable and free from external airflow.

Figure 8:
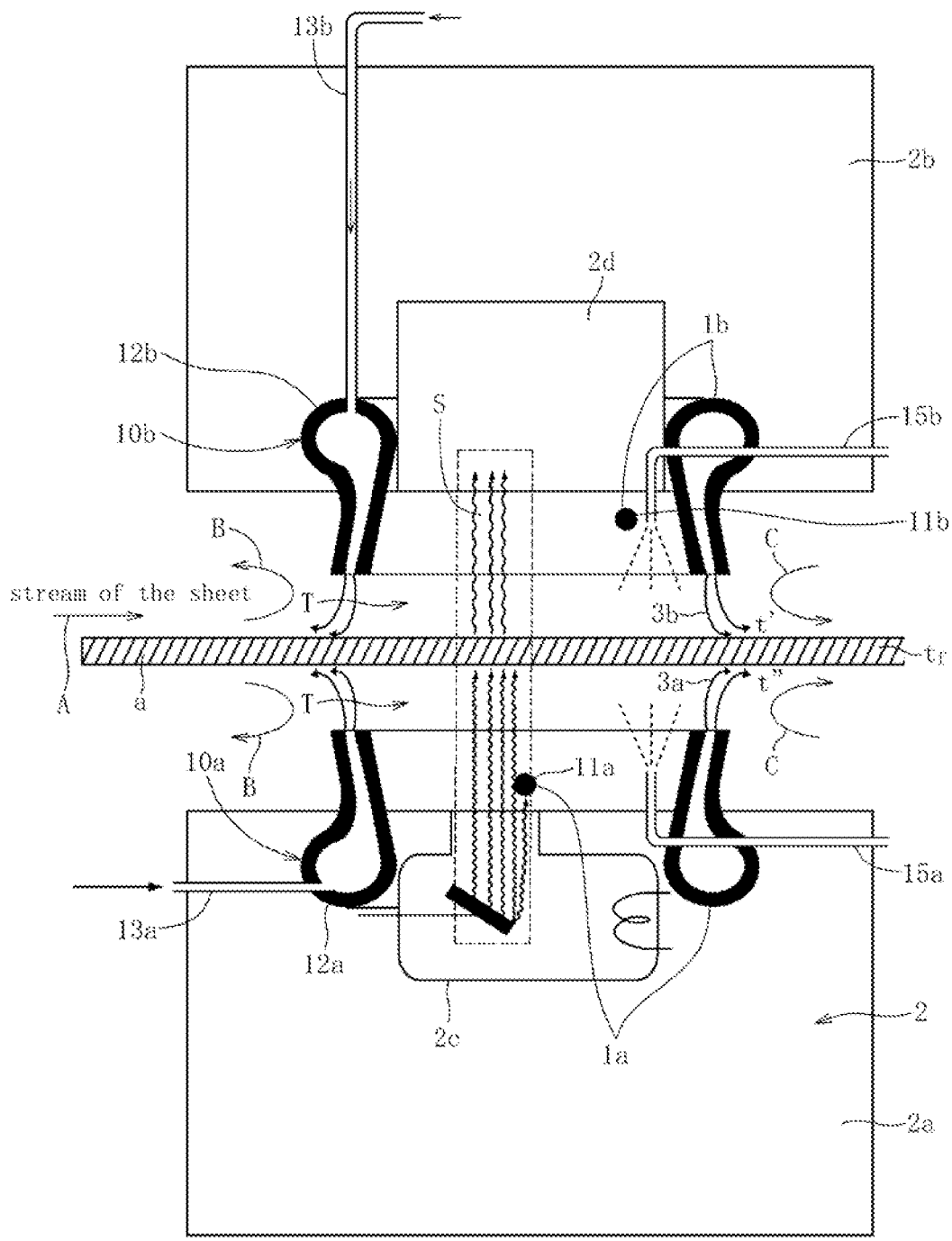
FIG. 8 is a partial enlarged cross-sectional view showing a variation of the temperature measuring apparatus in the first preferred embodiment according to the present invention.

A variation of the first preferred embodiment of the temperature measuring apparatus according to the present invention will now be described. This modified embodiment is, as can be seen in FIG. 8, provided with nozzles 15 used to jet temperature regulating air at a predetermined temperature and moisturizing air at a predetermined humidity into the isolated atmosphere free from external airflow. In this way, the atmosphere free from external airflow can be retained as an environment without any effect of external temperature and humidity, thereby allowing for an enhanced precision of measurement.

Figure 9:
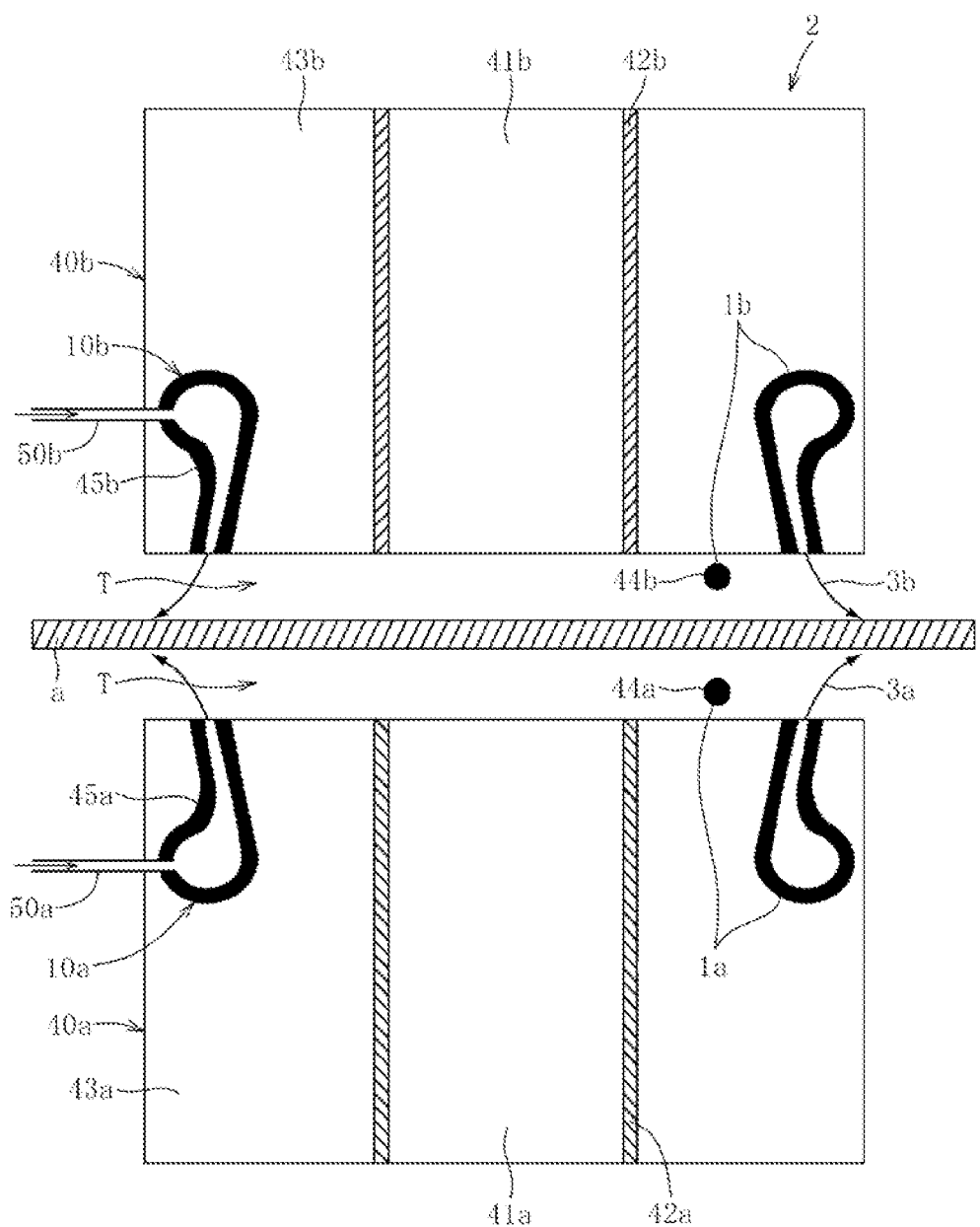
FIG. 9 is a partial enlarged cross-sectional view showing a second preferred embodiment of the temperature measuring apparatus according to the present invention.

FIG. 9 depicts a second preferred embodiment of the temperature measuring apparatus according to the present invention. In the first preferred embodiment, the sheet-thickness gauge sensor of electro-magnetic wave emitting type, especially, the X-ray emitting gauge sensor is provided to serve as the physical quantity measuring means 2, and alternatively as shown in FIG. 9, any of capacitance-operated sheet-thickness gauge sensors may be used. The capacitance-operated sheet-thickness gauge sensor typically has a pair of sensor head elements 40a, 40b that cooperatively take a posture of pinching the sheet a, and the sensor head elements 40a, 40b have their respective sensor electrodes 41a, 41b, insulating members 42a, 42b, and guard rings 43a, 43b. Specifically, the sensor electrodes 41a, 41b shaped in columnar are covered respectively with the insulating members 42a, 42b that are disposed concentric with them, and the insulating members 42a 42b are respectively surrounded by outer coating of the electrically conductive guard rings 43a, 43b that are concentric with the insulating members 42a, 42b. This embodiment employs a system in which varied capacitance between the electrodes is used to determine the thickness of the sheet a. Specifically, a variation in thickness of the sheet a is recognized as a variation in capacitance between the electrodes 41a, 41b to quantify the measured thickness of the sheet a.

In this embodiment, the guard rings 43a, 43b have their respective external airflow shielding members 10a, 10b. The external airflow shielding members 10a, 10b are respectively comprised of air supplies (not shown), nozzles 45a, 45b feeding air to the sheet a, and air ducts 50a, 50b leading air from the air supplies to the nozzles 45a, 45b and air ducts 50a, 50b leading air from the air supplies to the nozzles 45a, 45b. Temperature sensing members 44a, 44b are located at an inner circumference of the nozzles and hence an outer circumference of the electrodes 41a, 41b. In this case, also, preferably the temperature sensing members 44a, 44b are quickly responding temperature sensors of reduced calorific capacity (e.g., thermo-couples other than radiation thermometers, resistance bulb thermometers, or the like). In this way, sensitive and accurate measurement of the temperature of the sheet a can be conducted without adverse effects of pneumatic turbulence such as external airflow on the temperature sensing members 44a, 44b. Thus, the capacitance-operated sheet-thickness gauge sensor can be replaced with the X-ray emission type sheet-thickness gauge sensors, having the similar performances to those of the X-ray emission type sheet-thickness gauge sensors.

Although FIG. 9 depicts two of the electrodes cooperatively taking a posture of pinching the sheet a in the capacitance-operated sheet-thickness gauge sensor, this may also be replaced with a system where measurement is taken merely on one side of the sheet a as illustrated in FIGS. 10(*a*) and 10(*b*). Specifically, a first sensor electrode 46 shaped in columnar is covered with a first insulating member 49 that is disposed concentric with the electrode 46 while a second sensor electrode 47 is covered with the second insulating member 48 of which outer circumference is concentrically encircled by a electrically conductive guard ring 43. In the sheet-thickness measuring system thus configured, varied capacitance detected between the electrodes is used to determine the thickness of the sheet a. Specifically, a variation in thickness of the sheet a is recognized as a variation in capacitance detected between the electrodes 46, 47 to quantify the thickness of the sheet a.

FIG. 11 depicts a third preferred embodiment of the temperature measuring apparatus according to the present invention. In the third embodiment, a laser emitting type sheet-thickness gauge sensor as in FIG. 11(a) is used to serve as the physical quantity measuring means 2. The sheet-thickness gauge sensor is comprised of a roll 32, a first displacement gauge 33, and a second displacement gauge 34. The first displacement gauge 33 may be any of suitable eddy-current sensors and magnetic sensors.

The roll 32 has its longitudinal extension oriented perpendicular to the direction in which the sheet a streams and is rotatably fixed to the main frame (not shown) of the apparatus, with its one end coupled to a motor (not shown) and the other end provided with a rotation angle detecting means (not shown) that has a fixed home position. The rotation angle detecting means may be any of suitable instruments such as an absolute rotary encoder capable of equiangular detection (e.g., every 15 degrees) within a range from 0 to 360 degrees in the direction of rotations by the roll 32, a combination unit of a rotation angle detector with a rotation home position sensor, and the like. During calibration, the motor is preferably preset to rotate the roll 32 at surface velocity (circumferential velocity) identical to that of the conveyer line for the sheet a. In this way, it is possible to ascertain no errors caused by the deviation in response time between the first and second displacement gauges 33, 34 and by the varied velocity of the conveyer line(s) for the sheet a.

The first displacement gauge 33 is located at part of the second displacement gauge 34 above the axis of the roll 32 so as to detect a variation in a distance A from the apex of the roll 32 and also to determine the highest level of parallel beams 35 emitted from a light emitting unit 34a. Any of suitable metal-sensitive or magnetism-sensitive displacement gauges may be used to serve as the first displacement gauge 33, and the optimum one depends upon physical properties of objects such as the sheet a. For instance, metal-sensitive gauges such as an eddy-current sensor may be desirable in the event of measuring electrically non-conductive sheets while magnetism-sensitive gauges may be appropriate in the event of measuring electrically conductive sheets.

The second displacement gauge 34 has a light emitter 34a and a light receptor 34b located opposite to each other on both sides of the roll 32, which cooperatively detect a variation in shielded parallel beams 35 to determine the thickness of the streaming sheet a that touches and then leaves the roll 32; and, for that purpose, laser beam emitting gauges, CCD imaging sensors, and other optical gauging means may be utilized to serve as the second displacement gauge 34.

In such a laser emitting type sheet-thickness gauge sensor, required factors include a distance A to the roll 32 originating from and detected by the first displacement gauge 33 and incident light on the light receptor 34b that is derived from the parallel light beams 35 emitted from the light emitter 34a and not shielded by the first displacement gauge 33, the roll 32, and the sheet a. First, the distance A between the first displacement gauge 33 and the roll 32 is determined in the absence of the sheet a, and then, after the sheet a is guided onto the roll 32, additional distance B between the first displacement gauge 33 and the sheet a is determined so as to obtain the difference in the equation t=A−B, namely, thickness t of the sheet a.

In this case, the external airflow shielding means 10 is disposed, surrounding the first displacement gauge 33. The external airflow shielding means 10 is herein comprised of an air supply (not shown), a nozzle 36 for feeding air toward the sheet a, and an air conduit 38 leading air from the air supply to the nozzle 36. A temperature sensor 37a is located on an inner circumference of the nozzle 36 and thus on an outer circumference of the first displacement gauge 33. Similar to the previous embodiments, the temperature sensor 37a is preferably a quickly responding temperature sensor of reduced calorific capacity (e.g., thermo-couples other than radiation thermometers, resistance bulb thermometers, or the like). This brings about sensitive and accurate measurement of temperature of the sheet a without adverse effects of the pneumatic turbulence such as external airflow. In this way, the laser emission type gauge sensor can be replaced with the X-ray emission type sheet-thickness gauge sensors, having the similar performances to those of the X-ray emission type sheet-thickness gauge sensors.

As for the location of the temperature sensor 37, unless it blocks the laser beams 35, a temperature sensing member 37b may be on the bottom surface of the first displacement gauge 33, as illustrated in FIGS. 11(b) and 11(c). The light beams are not limited to those from lasers, and the beams from various light sources such as light emitting diodes may be utilized.

In a fourth embodiment of the present invention, an ultrasonic sheet-thickness gauge sensor (not shown) may be used to serve as the physical quantity measuring means 2. This alternative gauge sensor, which is similar in configuration to its counterpart instruments depicted in FIGS. 2, 3 and 8, develops ultrasonic waves instead of radiating X-rays. Specifically, the ultrasonic sheet-thickness gauge sensor determines a period of time that elapses from its emission of short ultrasonic pulses in a direction across the thickness-wise extension of the sheet a till the pulses incident on the sheet a return as reflected waves, and then, it multiplies the period of time with the acoustic velocity to obtain the thickness of the sheet a. Additionally, in the light of the phenomenon that the sheet a is resonated when ultrasonic waves with an appropriate frequency are applied so that their wavelength are, if multiplied with a certain integer, equal to twice the thickness of the sheet a, it will be appreciated that the thickness of the sheet a can be obtained from ultrasonic resonant frequency in the direction along the thickness-wise extension of the sheet a. Also, an attenuation rate of the ultrasonic waves may be used to determine the thickness.

In a fifth preferred embodiment of the present invention, a pneumatic sheet-thickness gauge sensor (not shown) is used to serve as the physical quantity measuring means 2. The thickness gauge sensor of this type jets and directs air of fixed pressure out of an air nozzle toward the sheet a. The air nozzle is coupled to a rod of a piston inserted in a cylinder, and back pressure of the air nozzle is forced to escape into a chamber lower than the piston within the cylinder while air pressure is always retained at a constant level in another chamber within the cylinder higher than the piston so as to work like counter-current to cope with the back pressure. Counterbalancing both the pressures acting within the upper and lower chambers permits the air nozzle and the sheet a to continually be spaced apart at a constant distance from each other, and as the sheet is varied in thickness, the space between the air nozzle and the sheet a is accordingly varied, which resultantly varies the back pressure. In this way, the piston rod is displaced as the pressures on opposite sides of the piston counteract over the other, and such motions of the rod is numerically measured as a displacement by a linear gauge to obtain the thickness of the sheet.

Figure 12:
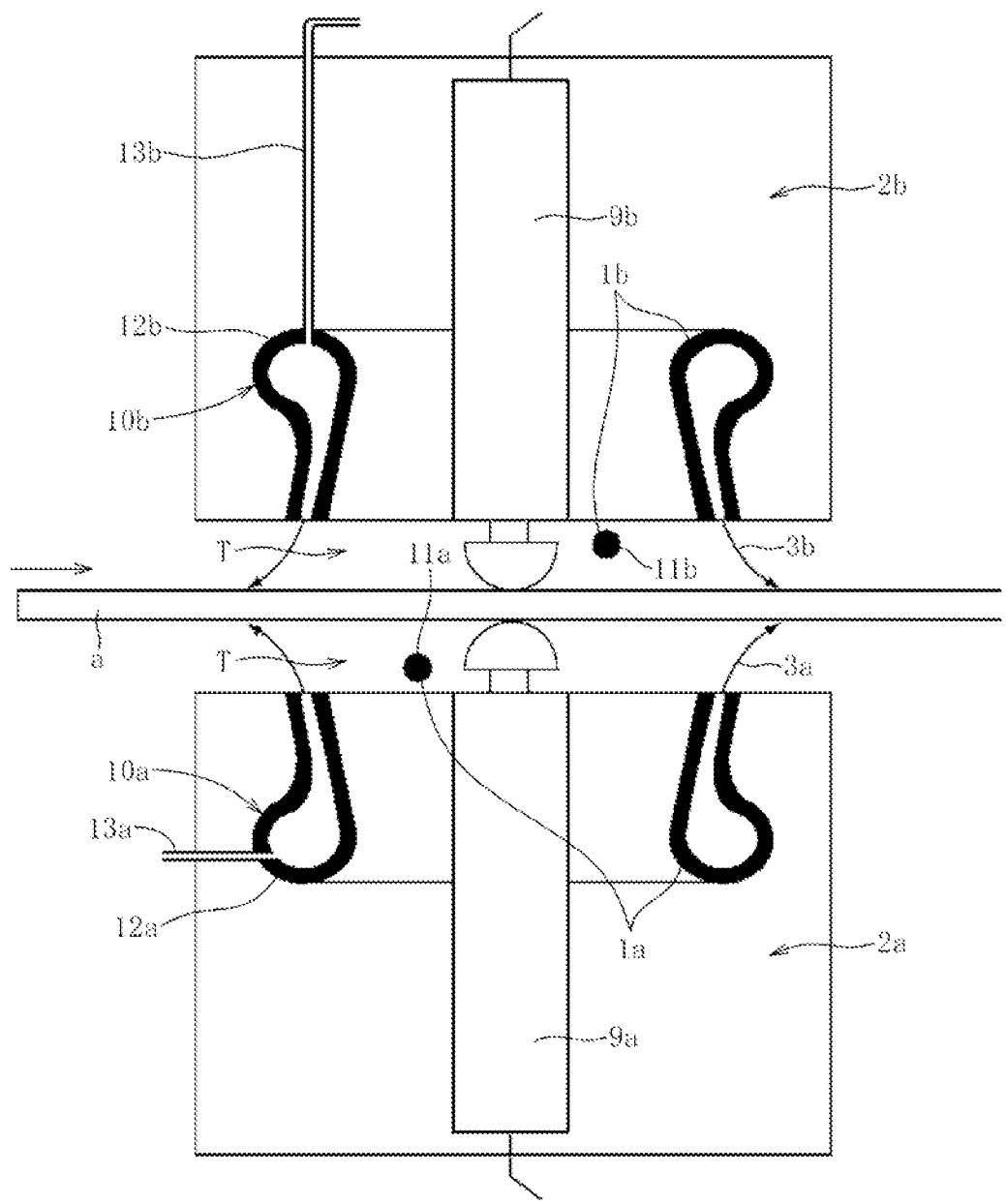
FIG. 12 is a partial enlarged cross-sectional view showing a sixth preferred embodiment of the temperature measuring apparatus according to the present invention.
Figure 13:
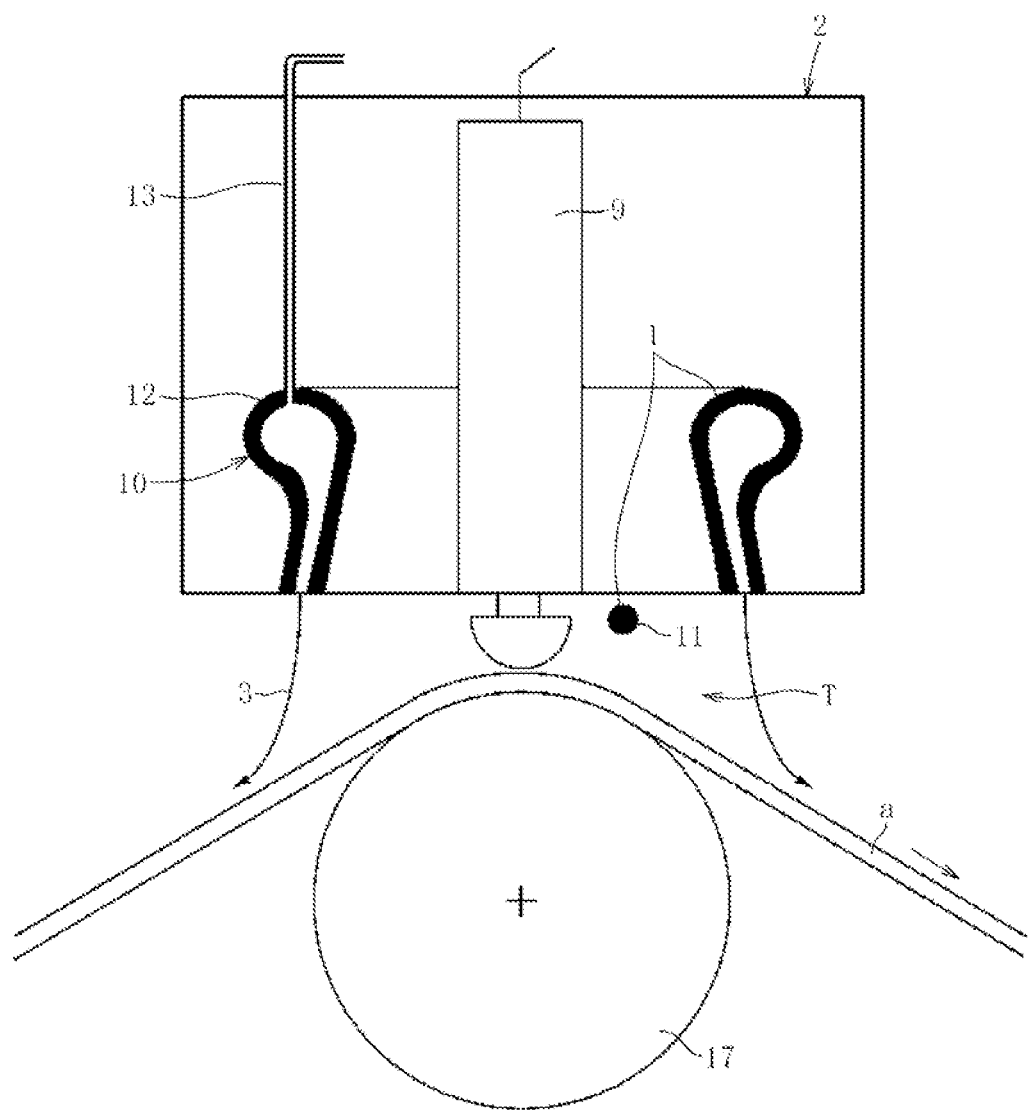
FIG. 13 is a partial enlarged cross-sectional view showing a variation of the temperature measuring apparatus in the sixth preferred embodiment according to the present invention.

In a sixth preferred embodiment of the present invention, a contact type sheet-thickness gauge sensor is used to serve as the physical quantity measuring means 2. As can be seen in FIG. 12, the displacement sensing members 9a, 9b, which are respectively located over and under the sheet a so as to takes a posture of pinching it from the opposite sides, are urged to come close to each other, having their respective tips touched to the sheet a to detect locations of the tips, thereby determining the thickness of the sheet a. An alternative to this contact type, as can be seen in FIG. 13, is a gauge sensor capable of detecting positions on a surface of the sheet a that is turned partially about a roll 17 in the course of its streaming. A displacement sensor 9 is urged to have its tip in contact with the sheet a around the roll 17 so as to detect a position of contact, thereby determining the thickness of the sheet a that intervenes between the sensor and the roll.

Figure 14:
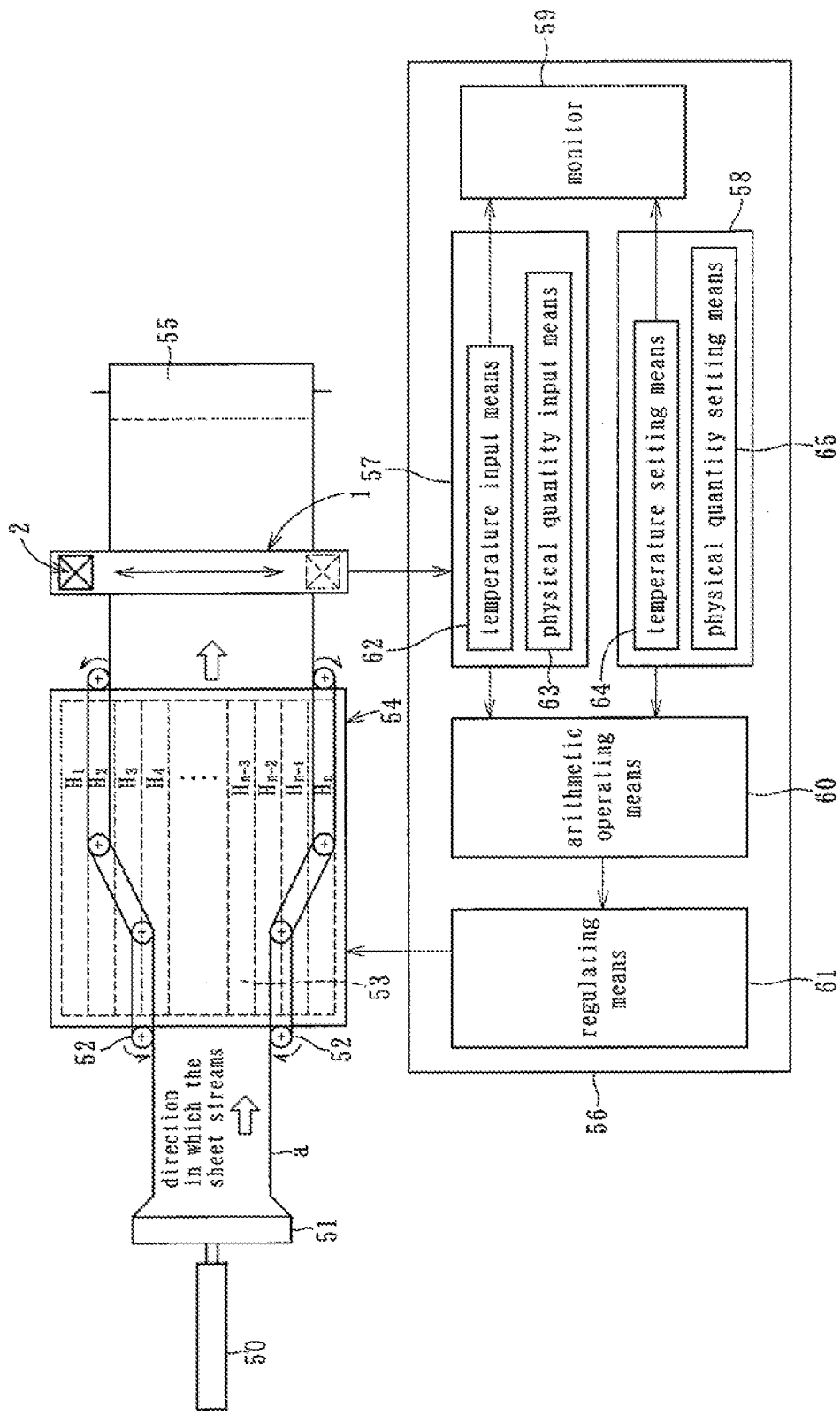
FIG. 14 is a schematic plan view showing a drawing machine incorporating the temperature measuring apparatus according to the present invention.
Figure 15:
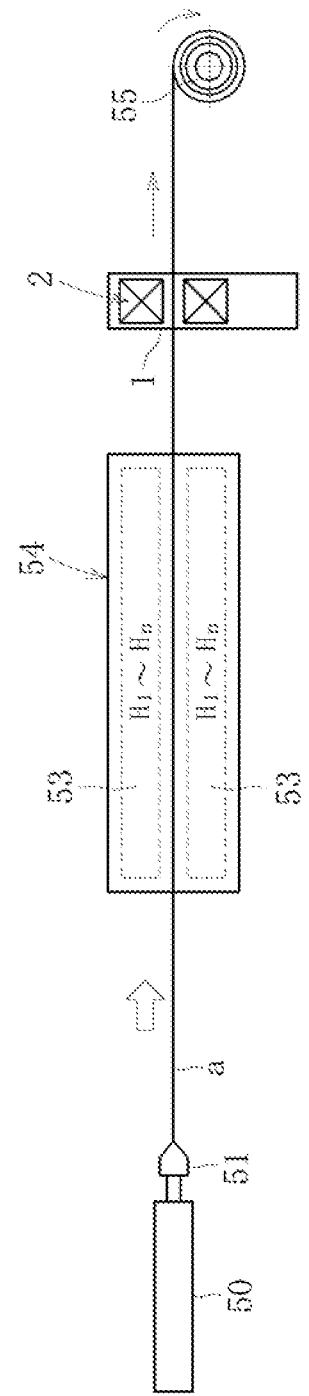
FIG. 15 is a schematic side view showing the drawing machine incorporating the temperature measuring apparatus according to the present invention.
Figure 16:
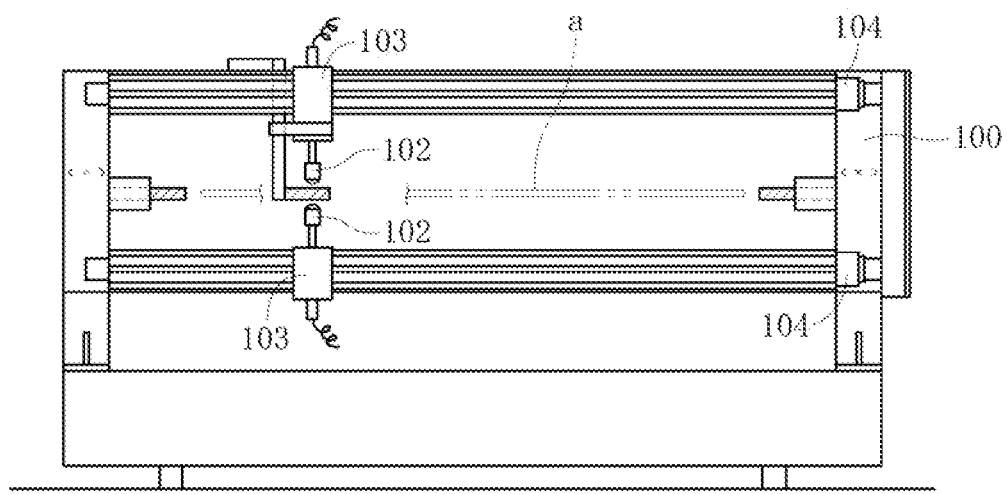
FIG. 16 is a schematic frontal view showing a prior art sheet-thickness gauge.

The aforementioned temperature measuring apparatuses and correcting apparatuses according to the present invention can be incorporated in a drawing machine, as depicted in FIGS. 14 and 15. The illustrated drawing machine has any of the temperature measuring apparatus according to the present invention. The drawing machine in FIGS. 14 and 15 is comprised of an extruding unit 50, a die 51 attached to the extruding unit 50, and a pair of guide rails 52 for drawing the preform or the sheet a in the rough while it is being conveyed in a direction indicated by an arrow, a heating means 53 disposed in a drawing unit 54 and consisting of a plurality of heaters H1 to Hn, the physical quantity measuring means 2 (i.e., the sheet-thickness gauge sensor in this case) located on the downstream side in the drawing machine 54, and a reeling unit 55 for taking up and winding the preform drawn into the sheet a. The physical quantity measuring means 2 is associated with the temperature measuring apparatus 1 according to the present invention. The drawing machine is provided with a control mechanism 56 controlling temperature of the heating means 53. The control mechanism 56 is comprised of an input unit 57 used to detect thickness and temperature of the sheet a subsequent to the process (drawing), a setting unit 58 for setting a temperature condition during treating the sheet a and an ideal thickness of the same, a monitor 59 for displaying the temperatures detected and preset, an arithmetic operating means 60 for detecting a correlation of the detected temperature with the measured thickness of the sheet a, and a regulating means 61 that serves to adjust temperature of the heating means 53, depending upon the detection results from the arithmetic operating means 60. The input unit 57 is comprised of a temperature input means 62 for retrieving the temperature of the sheet a that should have been measured by the temperature measuring apparatus 1, and a physical quantity input means 63 for retrieving the thickness of the sheet a that should have been measured by the sheet-thickness gauge sensor 2. The setting unit 58 is comprised of a temperature setting means 64 for setting temperature of the sheet in the lateral directions, and a physical quantity setting means 65 for setting an ideal value of the thickness.

A temperature controlling method applied to the drawing machine will now be described. The sheet a extruded by the extruding unit 50 is conveyed along the guide rails 52 in the direction indicated by the arrow. In the drawing machine 54, the sheet a is heated so as to have a temperature preset by the temperature setting means 64 and a thickness preset by the physical quantity setting means 65 while it simultaneously has its lateral extension drawn by the guide rails 52 spreadable as wide as the predetermined sheet width. After that, the sheet a has its thickness measured by the physical quantity measuring means 2, and based on the measurement, the physical quantity input means 63 produces a profile of the thickness. In simultaneous with these succeeding procedures, the temperature measuring apparatus 1 determines the temperature along the lateral extension of the sheet a, and resultantly, the temperature input means 62 produces a profile of the temperature. Then the arithmetic operating means 60 detects a correlation of the temperature profile with the profile of the measured thickness. Depending upon the detection results from the arithmetic operating means 60, the temperature setting means 64 and the physical quantity setting means 65 revise their respective preset values so that the regulating means 61 can adjust the heating means 53 to the desired temperature. Thus, determining the temperature of the sheet a with accuracy during the drawing process facilitates the drawing with enhanced precision.

As for the control mechanism 56, an operator is able to manually treat the regulating means 61 while visually confirming the temperature profile along the lateral extension of the sheet a on the monitor. As has been described, the sheet-thickness measuring sensor 2, if combined with the temperature measuring apparatus, is capable of producing the correlation of the temperature profile along the lateral extension of the sheet a with the thickness profile, and thus, the thickness profile of the lateral extension of the sheet a can be adjusted with enhanced precision.

The aforementioned embodiments are directed to determine a thickness-wise dimension of sheet-like objects, and a variety of alternatives are contemplated to measure any other physical quantity such as lengthwise dimension, mass, density, basis weight, electric current, electric charge, voltage, potential difference, force, energy, velocity, magnetism, and optical properties.

Although the preferred embodiments of the present invention have been described, it is not intended that the invention should be limited to the precise forms of them, and instead, modifications are made in various manners; for example, the X-ray emitter 2a and the X-ray detector 2b may be reversed in their respective positions, being relocated from upper to lower and vice versa. The air stream developed from the external airflow shielding means 10 is not limited to dynamic air, but it may be of any gaseous fluid. The reference point C may be located in any position out of the center area of the apparatus; that is, it may be replaced with a point D or may be on a pair with the point D. Either of the temperature sensing members 11 may be located as the single temperature sensor over or under the sheet a. The rectifying plate 14 in the reference point may be omitted. A variety of sheet-like objects of various substances and dimensions are envisioned as a substitution for the sheet a, including anything shaped in webs made of paper, sheet, or film, or sheet-shaped plate pieces, and even sheet-like pieces rolled up in cylinder of a very large curvature of radius. The gaseous fluid jetted out of the nozzle 15 (FIG. 8) may be for simply regulating either of temperature and humidity.

Although the physical quantity is described as the thickness of the sheet-like objects in the context of the aforementioned embodiments, it may be any of a wide variety of numerically indicated factors such as mass, volume, and the like. When the physical quantity is replaced with a mass of the sheet-like objects, an application to basis weight gauge is contemplated. In an application to measurement of temperature distribution of sheet-like objects during the sheet manufacturing process, heating or cooling effects on films or sheets can be determined in some quantifiable ways.

INDUSTRIAL APPLICABILITY

The present invention is applicable to drawing machines as well as thickness gauges.

The invention claimed is:

1. A temperature measuring apparatus for measuring a temperature of a sheet-shaped object when a physical quantity of the sheet-shaped object is to be measured by a physical quantity measuring device, the temperature measuring apparatus comprising:
   an external airflow shielding device comprising an air supply, one or more air nozzles, and one or more air ducts leading air from the air supply to the one or more air nozzles, wherein the external airflow shielding device creates an air curtain around a measuring area where the sheet-shaped object is to be measured for its physical quantity by jetting air toward the sheet-shaped object and an atmosphere is formed inside the air curtain where an external airflow is blocked; and
   one or more temperature sensors located at a position for detecting a temperature on or in a proximity of the sheet-shaped object in the atmosphere formed inside the air curtain.

2. The temperature measuring apparatus according to claim 1, wherein the physical quantity measuring device emits electromagnetic waves, radioactive rays, or particle rays toward the sheet-shaped object to detect the electromagnetic waves, the radioactive rays, or the particle rays transmitted through the sheet-shaped object, and temperature measurement is conducted within reach of the electromagnetic waves, the radioactive rays, or the particle rays emitted by the physical quantity measuring device.

3. The temperature measuring apparatus according to claim 1, wherein the physical quantity measuring device emits electromagnetic waves, radioactive rays, or particle rays toward the sheet-shaped object to detect the electromagnetic waves, the radioactive rays, or the particle rays transmitted through the sheet-shaped object, and temperature measurement is conducted out of reach of the electromagnetic waves, the radioactive rays, or the particle rays emitted by the physical quantity measuring device.

4. The temperature measuring apparatus according to claim 1, wherein the sheet-shaped object streams in a direction along its longitudinal extension, and a velocity of the jetted air that reaches the sheet-shaped object is greater than a streaming velocity of the sheet-shaped object.

5. The temperature measuring apparatus according to claim 1, further comprising one or more additional nozzles capable of jetting temperature and/or humidity adjusting gaseous fluid, the one or more additional nozzles being provided in the atmosphere where the external airflow is blocked to create a steady environment on which external air has no effect with regard its temperature and/or humidity.

6. The temperature measuring apparatus according to claim 1, wherein the physical quantity is any selected from thickness-wise and lengthwise dimensions, mass, density, basis weight, electric current, electric charge, voltage, potential difference, force, energy, velocity, magnetism, and optical properties of the sheet-shaped object.

7. The temperature measuring apparatus according to claim 1,
   wherein the sheet-shaped object is a processed sheet-shaped object, and
   wherein the temperature measuring apparatus further comprises:
      an arithmetic operating means for detecting a correlation between the physical quantity of the processed sheet-shaped object and its temperature measured in the atmosphere where the external airflow is blocked; and
      a regulating means for controlling the temperature of the processed sheet-shaped object with reference to the correlation so that the physical quantity has a predetermined ideal value.

8. The temperature measuring apparatus according to claim 7, wherein the arithmetic operation means is adapted for computing a difference between a temperature measured at a reference point that is free of sheet-shaped objects and the temperature obtained in the atmosphere where the external airflow is blocked, computing a variation rate in emissions radiated from the physical quantity measuring device, depending upon the difference in temperature, scaling a deviation of the measured physical quantity of the processed sheet-shaped object from a real physical quantity of the processed sheet-shaped object to the variation rate, and adding or reducing the deviation to or from the measured physical quantity of the processed sheet-shaped object to correct the physical quantity of the processed sheet-shaped object, thereby determining the physical quantity of the processed sheet-shaped object.

9. A temperature measuring method for determining a physical quantity of a sheet-shaped object that is adapted to measure a temperature in a measuring area where the sheet-shaped object is to be measured for its physical quantity, the temperature measuring method comprising:
   providing an external airflow shielding device comprising an air supply, one or more air nozzles, and one or more air ducts leading air from the air supply to the one or more air nozzles;
   jetting air toward the sheet-shaped object;
   creating an air curtain around the measuring area by the jetting of the air;
   forming an atmosphere inside the air curtain to block an external airflow; and
   detecting a temperature on or in a proximity of the sheet-shaped object in the atmosphere formed inside the air curtain where the external airflow is blocked.

10. A temperature measuring method comprising:
    determining a physical quantity of a processed sheet-shaped object with a physical quantity measuring device; and
    measuring temperature of the processed sheet-shaped object in the atmosphere where the external airflow is blocked in accordance with the temperature measuring method defined in claim 9;
    detecting a correlation between the physical quantity of the processed sheet-shaped object and its temperature measured in the atmosphere formed inside the air curtain; and
    controlling the temperature of the processed sheet-shaped object with reference to the correlation so that the physical quantity has a predetermined ideal value.

11. A temperature measuring method comprising:
    measuring a temperature at a reference point that is free of sheet-shaped objects;
    determining a physical quantity of a sheet-shaped object with a physical quantity measuring device;
    measuring a temperature of the sheet-shaped object in the atmosphere where the external airflow is blocked in accordance with the temperature measuring method defined in claim 9;
    computing a difference between a temperature measured at the reference point and the temperature obtained in the measuring area;
    computing a variation rate in the physical quantity measuring device, depending upon the difference in temperature;

scaling a deviation of a measured physical quantity of the sheet-shaped object from a real physical quantity of the sheet-shaped object according to the variation rate; and adding or reducing the deviation to or from the measured physical quantity of the sheet-shaped object to correct the physical quantity of the sheet-shaped object.

12. The temperature measuring apparatus according to claim 2, wherein the sheet-shaped object streams in a direction along its longitudinal extension, and a velocity of the jetted air that reaches the sheet-shaped object is greater than a streaming velocity of the sheet-shaped object.

13. The temperature measuring apparatus according to claim 3, wherein the sheet-shaped object streams in a direction along its longitudinal extension, and a velocity of the jetted air that reaches the sheet-shaped object is greater than a streaming velocity of the sheet-shaped object.

14. The temperature measuring apparatus according to claim 2, further comprising one or more additional nozzles capable of jetting temperature and/or humidity adjusting gaseous fluid, the one or more additional nozzles being provided in the atmosphere where the external airflow is blocked to create a steady environment on which external air has no effect with regard to its temperature and/or humidity.

15. The temperature measuring apparatus according to claim 3, further comprising one or more additional nozzles capable of jetting temperature and/or humidity adjusting gaseous fluid the one or more additional nozzles being provided in the atmosphere where the external airflow is blocked to create a steady environment on which the external air has no effect with regard to its temperature and/or humidity.

16. The temperature measuring apparatus according to claim 2, wherein the physical quantity is any selected from thickness-wise and lengthwise dimensions, mass, density, basis weight, electric current, electric charge, voltage, potential difference, force, energy, velocity, magnetism, and optical properties of the sheet-shaped object.

17. The temperature measuring apparatus according to claim 3, wherein the physical quantity is any selected from thickness-wise and lengthwise dimensions, mass, density, basis weight, electric current, electric charge, voltage, potential difference, force, energy, velocity, magnetism, and optical properties of the sheet-shaped object.

18. The temperature measuring apparatus according to claim 2, wherein the web or sheet-shaped object is a processed sheet-shaped object, and wherein the temperature measuring apparatus further comprises:
an arithmetic operating means for detecting a correlation between the physical quantity of the processed sheet-shaped object and its temperature measured in the atmosphere where the external airflow is blocked; and
a regulating means for controlling the temperature of the processed sheet-shaped object with reference to the correlation so that the physical quantity has a predetermined ideal value.

19. The temperature measuring apparatus according to claim 3, wherein the sheet-shaped object is a processed sheet-shaped object, and wherein the temperature measuring apparatus further comprises:
an arithmetic operating means for detecting a correlation between the physical quantity of the processed sheet-shaped object and its temperature measured in the atmosphere where the external airflow is blocked; and
a regulating means for controlling the temperature of the processed sheet-shaped object with reference to the correlation so that the physical quantity has a predetermined ideal value.

* * * * *